(12) United States Patent
Rodriguez et al.

(10) Patent No.: US 8,707,153 B2
(45) Date of Patent: Apr. 22, 2014

(54) DISPLAYING COMMENT DATA CORRESPONDING TO A VIDEO PRESENTATION

(75) Inventors: Arturo A. Rodriguez, Norcross, GA (US); Dean F. Jerding, Roswell, GA (US); Robert O. Banker, Cumming, GA (US)

(73) Assignee: Cisco Technology, Inc., San Jose, CA (US)

( * ) Notice: Subject to any disclaimer, the term of this patent is extended or adjusted under 35 U.S.C. 154(b) by 1541 days.

(21) Appl. No.: 11/678,653

(22) Filed: Feb. 26, 2007

(65) Prior Publication Data

US 2007/0136748 A1    Jun. 14, 2007

Related U.S. Application Data

(63) Continuation of application No. 09/693,780, filed on Oct. 20, 2000, now Pat. No. 7,200,857, which is a continuation-in-part of application No. 09/590,520, filed on Jun. 9, 2000, now Pat. No. 7,010,801.

(60) Provisional application No. 60/214,987, filed on Jun. 29, 2000.

(51) Int. Cl.
    *G06F 17/00* (2006.01)
    *G06F 17/24* (2006.01)
    *H04N 21/472* (2011.01)
    *H04N 21/422* (2011.01)

(52) U.S. Cl.
    CPC ........ *G06F 17/241* (2013.01); *H04N 21/47202* (2013.01); *H04N 21/42204* (2013.01)
    USPC ....................................................... 715/203

(58) Field of Classification Search
    CPC ................. H04N 21/47202; H04N 21/42204; G06F 17/241; G06F 17/30011; G06F 17/2205
    USPC ....................................................... 715/203
    See application file for complete search history.

(56) References Cited

U.S. PATENT DOCUMENTS

| 3,676,580 A | 7/1972 | Beck |
| 4,586,158 A | 4/1986 | Brandle |

(Continued)

FOREIGN PATENT DOCUMENTS

| CA | 2 363 052 A1 | 11/1995 |
| CA | 2 223 025 C | 11/2001 |

(Continued)

OTHER PUBLICATIONS

Rousseau, et al., "Synchronized multimedia for the WWW", retrieved from http://www7.wwwconference.org/1833/com1833.htm on Nov. 21, 2013, p. 1-15.*

(Continued)

*Primary Examiner* — Amelia Rutledge
(74) *Attorney, Agent, or Firm* — Merchant & Gould

(57) ABSTRACT

Video presenting systems and methods are disclosed herein. In one embodiment, among others, a method comprises presenting a video presentation and enabling a viewer to select an option to receive a plurality of sequential data supplements. The sequential data supplements correspond to on-screen comments of the video presentation. In addition, the sequential data supplements have a plurality of respective time intervals corresponding to respective portions of the video presentation. The method further comprises receiving a first input from the viewer regarding selection of the option to receive the plurality of sequential data supplements. Responsive to receiving the first input corresponding to selecting the option to receive the plurality of sequential data supplements, the method includes providing the plurality of sequential data supplements at the plurality of respective times corresponding to respective portions of the video presentation. The on-screen comments include comments from another viewer and at least one set of comments selected from director comments, producer comments, and actor comments.

28 Claims, 11 Drawing Sheets

(56) References Cited

U.S. PATENT DOCUMENTS

| | | |
|---|---|---|
| 4,706,121 A | 11/1987 | Young |
| 4,751,578 A | 6/1988 | Reiter et al. |
| 4,821,097 A * | 4/1989 | Robbins ................. 348/485 |
| 4,827,250 A | 5/1989 | Stallkamp |
| 4,885,775 A | 12/1989 | Lucas |
| 4,908,713 A | 3/1990 | Levine |
| 4,930,158 A | 5/1990 | Vogel |
| 4,949,187 A | 8/1990 | Cohen |
| 4,963,994 A | 10/1990 | Levine |
| 4,984,152 A | 1/1991 | Mueller |
| 4,991,011 A | 2/1991 | Johnson et al. |
| 5,038,211 A | 8/1991 | Hallenbeck |
| 5,172,413 A | 12/1992 | Bradley et al. |
| 5,191,410 A | 3/1993 | McCalley et al. |
| 5,253,066 A | 10/1993 | Vogel |
| 5,291,554 A | 3/1994 | Morales |
| 5,293,357 A | 3/1994 | Hallenbeck |
| 5,317,391 A | 5/1994 | Banker et al. |
| 5,329,590 A | 7/1994 | Pond |
| 5,353,121 A | 10/1994 | Young et al. |
| 5,357,276 A | 10/1994 | Banker et al. |
| 5,359,362 A | 10/1994 | Lewis et al. |
| 5,371,551 A | 12/1994 | Logan et al. |
| 5,398,071 A | 3/1995 | Gove et al. |
| 5,410,326 A | 4/1995 | Goldstein |
| 5,410,343 A | 4/1995 | Coddington et al. |
| 5,410,344 A | 4/1995 | Graves et al. |
| 5,414,455 A | 5/1995 | Hooper et al. |
| 5,418,622 A | 5/1995 | Takeuchi |
| 5,448,313 A | 9/1995 | Kim et al. |
| 5,461,427 A | 10/1995 | Duffield et al. |
| 5,477,262 A | 12/1995 | Banker et al. |
| 5,479,268 A | 12/1995 | Young et al. |
| 5,481,542 A | 1/1996 | Logston et al. |
| 5,483,277 A | 1/1996 | Granger |
| 5,485,216 A | 1/1996 | Lee |
| 5,493,638 A | 2/1996 | Hooper et al. |
| 5,508,815 A | 4/1996 | Levine |
| 5,512,958 A | 4/1996 | Rzeszewski |
| 5,515,495 A | 5/1996 | Ikemoto |
| 5,521,631 A | 5/1996 | Budow et al. |
| 5,530,754 A | 6/1996 | Garfinkle |
| 5,532,735 A | 7/1996 | Blahut et al. |
| 5,532,754 A | 7/1996 | Young et al. |
| 5,544,354 A | 8/1996 | May et al. |
| 5,555,441 A | 9/1996 | Haddad |
| 5,557,541 A | 9/1996 | Schulhof et al. |
| 5,562,732 A | 10/1996 | Eisenberg |
| 5,568,272 A | 10/1996 | Levine |
| 5,583,560 A | 12/1996 | Florin et al. |
| 5,583,995 A | 12/1996 | Gardner et al. |
| 5,585,821 A | 12/1996 | Ishikura et al. |
| 5,585,838 A | 12/1996 | Lawler et al. |
| 5,589,892 A | 12/1996 | Knee et al. |
| 5,592,551 A | 1/1997 | Lett et al. |
| 5,594,509 A | 1/1997 | Florin et al. |
| 5,598,524 A | 1/1997 | Johnston, Jr. et al. |
| 5,600,364 A | 2/1997 | Hendricks et al. |
| 5,600,573 A | 2/1997 | Hendricks et al. |
| 5,614,940 A | 3/1997 | Cobbley et al. |
| 5,619,247 A | 4/1997 | Russo |
| 5,619,249 A | 4/1997 | Billock et al. |
| 5,621,456 A | 4/1997 | Florin et al. |
| 5,623,613 A | 4/1997 | Rowe et al. |
| 5,625,405 A | 4/1997 | DuLac et al. |
| 5,625,864 A | 4/1997 | Budow et al. |
| 5,629,732 A | 5/1997 | Moskowitz et al. |
| 5,631,693 A | 5/1997 | Wunderlich et al. |
| 5,632,681 A | 5/1997 | Bakoglu et al. |
| 5,635,979 A | 6/1997 | Kostreski et al. |
| 5,635,980 A | 6/1997 | Lin et al. |
| 5,635,989 A | 6/1997 | Rothmuller |
| 5,650,831 A | 7/1997 | Farwell |
| 5,659,350 A | 8/1997 | Hendricks et al. |
| 5,664,133 A | 9/1997 | Malamud |
| 5,666,293 A | 9/1997 | Metz et al. |
| 5,671,411 A | 9/1997 | Watts et al. |
| 5,675,752 A | 10/1997 | Scott et al. |
| 5,682,206 A | 10/1997 | Wehmeyer et al. |
| 5,682,597 A | 10/1997 | Ganek et al. |
| 5,684,918 A | 11/1997 | Abecassis |
| 5,686,954 A | 11/1997 | Yoshinobu et al. |
| 5,687,331 A | 11/1997 | Volk et al. |
| 5,689,641 A * | 11/1997 | Ludwig et al. ................. 709/241 |
| 5,694,176 A | 12/1997 | Bruette et al. |
| 5,694,546 A | 12/1997 | Reisman |
| 5,699,107 A | 12/1997 | Lawler et al. |
| 5,710,591 A * | 1/1998 | Bruno et al. ................. 348/14.09 |
| 5,715,169 A | 2/1998 | Noguchi |
| 5,715,515 A | 2/1998 | Akins, III et al. |
| 5,717,468 A * | 2/1998 | Baryla ................. 725/37 |
| 5,721,827 A | 2/1998 | Logan et al. |
| 5,721,829 A | 2/1998 | Dunn et al. |
| 5,721,897 A | 2/1998 | Rubinstein |
| 5,724,106 A | 3/1998 | Autry et al. |
| 5,724,521 A | 3/1998 | Dedrick |
| 5,724,646 A | 3/1998 | Ganek et al. |
| 5,727,060 A | 3/1998 | Young |
| 5,729,549 A | 3/1998 | Kostreski et al. |
| 5,732,216 A | 3/1998 | Logan et al. |
| 5,734,853 A | 3/1998 | Hendricks et al. |
| 5,737,028 A | 4/1998 | Bertram et al. |
| 5,740,304 A | 4/1998 | Katsuyama et al. |
| 5,740,549 A | 4/1998 | Reilly et al. |
| 5,745,837 A | 4/1998 | Fuhrmann |
| 5,748,493 A | 5/1998 | Lightfoot et al. |
| 5,751,282 A | 5/1998 | Girard et al. |
| 5,752,160 A | 5/1998 | Dunn |
| 5,754,773 A | 5/1998 | Ozden et al. |
| 5,764,873 A | 6/1998 | Magid et al. |
| 5,764,899 A | 6/1998 | Eggleston et al. |
| 5,771,435 A | 6/1998 | Brown |
| 5,774,170 A | 6/1998 | Hite et al. |
| 5,778,077 A | 7/1998 | Davidson |
| 5,790,170 A | 8/1998 | Suzuki |
| 5,790,176 A | 8/1998 | Craig |
| 5,790,935 A | 8/1998 | Payton |
| 5,790,940 A | 8/1998 | Laborde et al. |
| 5,796,828 A | 8/1998 | Tsukamoto et al. |
| 5,798,785 A | 8/1998 | Hendricks et al. |
| 5,799,063 A | 8/1998 | Krane |
| 5,801,747 A | 9/1998 | Bedard |
| 5,801,787 A | 9/1998 | Schein et al. |
| 5,802,502 A | 9/1998 | Gell et al. |
| 5,808,608 A | 9/1998 | Young et al. |
| 5,808,611 A | 9/1998 | Johnson et al. |
| 5,809,204 A | 9/1998 | Young et al. |
| 5,812,123 A | 9/1998 | Rowe et al. |
| 5,812,124 A | 9/1998 | Eick et al. |
| 5,812,786 A | 9/1998 | Seazholtz et al. |
| 5,822,123 A | 10/1998 | Davis et al. |
| 5,826,110 A | 10/1998 | Ozden et al. |
| 5,828,419 A | 10/1998 | Bruette et al. |
| 5,828,845 A | 10/1998 | Jagadish et al. |
| 5,835,843 A | 11/1998 | Haddad |
| 5,838,314 A | 11/1998 | Neel et al. |
| 5,844,620 A | 12/1998 | Coleman et al. |
| 5,848,352 A | 12/1998 | Dougherty et al. |
| 5,850,218 A | 12/1998 | LaJoie et al. |
| 5,856,975 A | 1/1999 | Rostoker et al. |
| 5,859,641 A | 1/1999 | Cave |
| 5,861,906 A | 1/1999 | Dunn et al. |
| 5,877,756 A | 3/1999 | Um |
| 5,880,768 A | 3/1999 | Lemmons et al. |
| 5,886,690 A | 3/1999 | Pond et al. |
| 5,886,732 A | 3/1999 | Humpleman |
| 5,895,454 A | 4/1999 | Harrington |
| 5,898,456 A | 4/1999 | Wahl |
| 5,900,905 A | 5/1999 | Shoff et al. |
| 5,905,522 A | 5/1999 | Lawler |
| 5,905,942 A | 5/1999 | Stoel et al. |
| 5,907,323 A | 5/1999 | Lawler et al. |
| 5,913,040 A | 6/1999 | Rakavy et al. |
| 5,914,712 A | 6/1999 | Sartain et al. |

(56) References Cited

U.S. PATENT DOCUMENTS

| | | |
|---|---|---|
| 5,914,746 A | 6/1999 | Matthews, III et al. |
| 5,915,068 A | 6/1999 | Levine |
| 5,917,822 A | 6/1999 | Lyles et al. |
| 5,929,849 A | 7/1999 | Kikinis |
| 5,930,493 A | 7/1999 | Ottesen et al. |
| 5,935,206 A | 8/1999 | Dixon et al. |
| 5,936,659 A | 8/1999 | Viswanathan |
| 5,940,073 A | 8/1999 | Klosterman et al. |
| 5,943,047 A | 8/1999 | Suzuki |
| 5,956,024 A | 9/1999 | Strickland et al. |
| 5,956,716 A | 9/1999 | Kenner et al. |
| 5,960,411 A | 9/1999 | Hartman et al. |
| 5,961,603 A | 10/1999 | Kunkel et al. |
| 5,969,748 A | 10/1999 | Casement et al. |
| 5,978,043 A | 11/1999 | Blonstein et al. |
| 5,983,273 A | 11/1999 | White et al. |
| 5,986,650 A | 11/1999 | Ellis et al. |
| 5,987,256 A | 11/1999 | Wu et al. |
| 5,990,881 A | 11/1999 | Inoue et al. |
| 5,990,890 A | 11/1999 | Etheredge |
| 5,990,927 A | 11/1999 | Hendricks et al. |
| 5,995,134 A | 11/1999 | Hayashi |
| 6,002,401 A | 12/1999 | Baker |
| 6,005,565 A | 12/1999 | Legall et al. |
| 6,005,631 A | 12/1999 | Anderson et al. |
| 6,006,257 A | 12/1999 | Slezak |
| 6,008,803 A | 12/1999 | Rowe et al. |
| 6,008,836 A | 12/1999 | Bruck et al. |
| 6,014,184 A | 1/2000 | Knee et al. |
| 6,014,694 A | 1/2000 | Aharoni et al. |
| 6,016,348 A | 1/2000 | Blatter et al. |
| 6,018,359 A | 1/2000 | Kermode |
| 6,018,372 A | 1/2000 | Etheredge |
| 6,020,912 A | 2/2000 | De Lang |
| 6,023,267 A | 2/2000 | Chapuis et al. |
| 6,025,837 A | 2/2000 | Matthews, III et al. |
| 6,025,868 A | 2/2000 | Russo |
| 6,025,869 A | 2/2000 | Stas et al. |
| 6,026,376 A | 2/2000 | Kenney |
| 6,035,281 A | 3/2000 | Crosskey et al. |
| 6,037,933 A | 3/2000 | Blonstein et al. |
| 6,049,831 A | 4/2000 | Gardell et al. |
| 6,057,872 A | 5/2000 | Candelore |
| 6,061,097 A | 5/2000 | Satterfield |
| 6,064,380 A | 5/2000 | Swenson et al. |
| 6,064,980 A | 5/2000 | Jacobi et al. |
| 6,070,186 A | 5/2000 | Nishio |
| 6,072,982 A | 6/2000 | Haddad |
| 6,073,105 A | 6/2000 | Sutcliffe et al. |
| 6,075,575 A | 6/2000 | Schein et al. |
| 6,081,263 A | 6/2000 | LeGall et al. |
| 6,085,185 A | 7/2000 | Matsuzawa et al. |
| 6,094,680 A | 7/2000 | Hokanson |
| 6,097,383 A | 8/2000 | Gaughan et al. |
| 6,098,082 A | 8/2000 | Gibbon et al. |
| 6,101,512 A | 8/2000 | DeRose et al. |
| 6,108,002 A | 8/2000 | Ishizaki |
| 6,108,042 A | 8/2000 | Adams et al. |
| 6,118,445 A | 9/2000 | Nonomura et al. |
| 6,118,976 A | 9/2000 | Arias et al. |
| 6,124,878 A | 9/2000 | Adams et al. |
| 6,125,259 A | 9/2000 | Perlman |
| 6,133,909 A | 10/2000 | Schein et al. |
| 6,137,539 A | 10/2000 | Lownes et al. |
| 6,138,139 A | 10/2000 | Beck et al. |
| 6,141,003 A | 10/2000 | Chor et al. |
| 6,141,488 A | 10/2000 | Knudson et al. |
| 6,145,083 A | 11/2000 | Shaffer et al. |
| 6,148,332 A | 11/2000 | Brewer et al. |
| 6,151,059 A | 11/2000 | Schein et al. |
| 6,157,377 A | 12/2000 | Shah-Nazaroff et al. |
| 6,157,413 A | 12/2000 | Hanafee et al. |
| 6,160,546 A | 12/2000 | Thompson et al. |
| 6,160,989 A | 12/2000 | Hendricks et al. |
| 6,163,272 A | 12/2000 | Goode et al. |
| 6,166,730 A | 12/2000 | Goode et al. |
| 6,169,543 B1 | 1/2001 | Wehmeyer |
| 6,172,674 B1 | 1/2001 | Etheredge |
| 6,172,677 B1 | 1/2001 | Stautner et al. |
| 6,177,931 B1 | 1/2001 | Alexander et al. |
| 6,181,333 B1 | 1/2001 | Chaney et al. |
| 6,181,693 B1 | 1/2001 | Maresca |
| 6,182,287 B1 | 1/2001 | Schneidewend et al. |
| 6,184,877 B1 * | 2/2001 | Dodson et al. ................ 725/110 |
| 6,188,684 B1 | 2/2001 | Setoyama et al. |
| 6,195,689 B1 | 2/2001 | Bahlmann |
| 6,201,540 B1 | 3/2001 | Gallup et al. |
| 6,205,485 B1 | 3/2001 | Kikinis |
| 6,208,335 B1 | 3/2001 | Gordon et al. |
| 6,209,130 B1 | 3/2001 | Rector et al. |
| 6,216,264 B1 | 4/2001 | Maze et al. |
| 6,238,290 B1 | 5/2001 | Tarr et al. |
| 6,239,845 B1 | 5/2001 | Itagaki et al. |
| 6,240,555 B1 | 5/2001 | Shoff et al. |
| 6,243,142 B1 | 6/2001 | Mugura et al. |
| 6,249,532 B1 | 6/2001 | Yoshikawa et al. |
| 6,253,375 B1 | 6/2001 | Gordon et al. |
| 6,259,733 B1 | 7/2001 | Kaye et al. |
| 6,266,814 B1 | 7/2001 | Lemmons et al. |
| 6,268,849 B1 | 7/2001 | Boyer et al. |
| 6,272,484 B1 | 8/2001 | Martin et al. |
| 6,275,268 B1 | 8/2001 | Ellis et al. |
| 6,282,713 B1 | 8/2001 | Kitsukawa et al. |
| 6,289,346 B1 | 9/2001 | Milewski et al. |
| 6,289,514 B1 | 9/2001 | Link et al. |
| 6,292,624 B1 | 9/2001 | Saib et al. |
| 6,305,019 B1 | 10/2001 | Dyer et al. |
| 6,311,011 B1 | 10/2001 | Kuroda |
| 6,314,572 B1 | 11/2001 | LaRocca et al. |
| 6,314,573 B1 | 11/2001 | Gordon et al. |
| 6,314,575 B1 | 11/2001 | Billock et al. |
| 6,317,777 B1 | 11/2001 | Skarbo et al. |
| 6,317,885 B1 | 11/2001 | Fries |
| 6,323,911 B1 | 11/2001 | Schein et al. |
| 6,327,628 B1 | 12/2001 | Anuff et al. |
| 6,335,936 B1 | 1/2002 | Bossemeyer, Jr. et al. |
| 6,347,400 B1 | 2/2002 | Ohkura et al. |
| 6,349,410 B1 | 2/2002 | Lortz |
| 6,353,448 B1 | 3/2002 | Scarborough et al. |
| 6,357,046 B1 | 3/2002 | Thompson et al. |
| 6,359,636 B1 | 3/2002 | Schindler et al. |
| 6,360,367 B1 | 3/2002 | Yamamoto |
| 6,362,841 B1 | 3/2002 | Nykanen |
| 6,367,078 B1 | 4/2002 | Lasky |
| 6,378,130 B1 | 4/2002 | Adams |
| 6,381,332 B1 | 4/2002 | Glaab |
| 6,385,614 B1 | 5/2002 | Vellandi |
| 6,393,585 B1 | 5/2002 | Houha et al. |
| 6,396,549 B1 | 5/2002 | Weber |
| 6,400,280 B1 | 6/2002 | Osakabe |
| 6,401,243 B1 | 6/2002 | Suzuki |
| 6,405,239 B1 | 6/2002 | Addington et al. |
| 6,421,067 B1 | 7/2002 | Kamen et al. |
| 6,429,899 B1 | 8/2002 | Nio et al. |
| 6,434,748 B1 | 8/2002 | Shen et al. |
| 6,441,862 B1 | 8/2002 | Yuen et al. |
| 6,442,332 B1 | 8/2002 | Knudson et al. |
| 6,442,755 B1 | 8/2002 | Lemmons et al. |
| 6,442,756 B1 | 8/2002 | Durden et al. |
| 6,446,261 B1 | 9/2002 | Rosser |
| 6,446,262 B1 | 9/2002 | Malaure et al. |
| 6,460,181 B1 | 10/2002 | Donnelly |
| 6,463,585 B1 | 10/2002 | Hendricks et al. |
| 6,476,833 B1 | 11/2002 | Moshfeghi |
| 6,480,669 B1 | 11/2002 | Tsumagari et al. |
| 6,481,010 B2 | 11/2002 | Nishikawa et al. |
| 6,481,011 B1 | 11/2002 | Lemmons |
| 6,486,920 B2 | 11/2002 | Arai et al. |
| 6,501,902 B1 | 12/2002 | Wang |
| 6,505,348 B1 | 1/2003 | Knowles et al. |
| 6,507,949 B1 | 1/2003 | Jonason et al. |
| 6,510,556 B1 | 1/2003 | Kusaba et al. |
| 6,515,680 B1 | 2/2003 | Hendricks et al. |
| 6,515,710 B1 | 2/2003 | Koshimuta |

(56) References Cited

U.S. PATENT DOCUMENTS

| | | |
|---|---|---|
| 6,519,770 B2 | 2/2003 | Ford |
| 6,526,575 B1 | 2/2003 | McCoy et al. |
| 6,526,577 B1 | 2/2003 | Knudson et al. |
| 6,532,589 B1 | 3/2003 | Proehl et al. |
| 6,536,041 B1 | 3/2003 | Knudson et al. |
| 6,539,548 B1 | 3/2003 | Hendricks et al. |
| 6,543,053 B1 | 4/2003 | Li et al. |
| 6,545,669 B1 | 4/2003 | Kinawi et al. |
| 6,557,030 B1 | 4/2003 | Hoang |
| 6,563,515 B1 | 5/2003 | Reynolds et al. |
| 6,564,378 B1 | 5/2003 | Satterfield et al. |
| 6,564,379 B1 | 5/2003 | Knudson et al. |
| 6,564,383 B1 | 5/2003 | Combs et al. |
| 6,571,390 B1 | 5/2003 | Dunn et al. |
| 6,574,793 B1 | 6/2003 | Ngo et al. |
| 6,578,077 B1 | 6/2003 | Rakoshitz et al. |
| 6,594,699 B1 | 7/2003 | Sahai et al. |
| 6,594,825 B1 | 7/2003 | Goldschmidt Iki et al. |
| 6,600,496 B1 | 7/2003 | Wagner et al. |
| 6,604,240 B2 | 8/2003 | Ellis et al. |
| 6,609,253 B1 | 8/2003 | Swix et al. |
| 6,611,958 B1 | 8/2003 | Shintani et al. |
| 6,614,440 B1 | 9/2003 | Bowen et al. |
| 6,614,988 B1 | 9/2003 | Sampsell |
| 6,628,302 B2 | 9/2003 | White et al. |
| 6,631,413 B1 | 10/2003 | Aggarwal et al. |
| 6,642,939 B1 | 11/2003 | Vallone et al. |
| 6,647,548 B1 | 11/2003 | Lu et al. |
| 6,651,044 B1 | 11/2003 | Stoneman |
| 6,662,365 B1 | 12/2003 | Sullivan et al. |
| 6,665,869 B1 | 12/2003 | Ellis et al. |
| 6,671,328 B1 | 12/2003 | Poon et al. |
| 6,675,384 B1 | 1/2004 | Block et al. |
| 6,675,385 B1 | 1/2004 | Wang |
| 6,678,891 B1 | 1/2004 | Wilcox et al. |
| 6,681,395 B1 | 1/2004 | Nishi |
| 6,681,396 B1 | 1/2004 | Bates et al. |
| 6,684,025 B1 | 1/2004 | Perlman |
| 6,684,400 B1 | 1/2004 | Goode et al. |
| 6,690,391 B1 | 2/2004 | Proehl et al. |
| 6,697,376 B1 | 2/2004 | Son et al. |
| 6,698,023 B2 | 2/2004 | Levitan |
| 6,701,523 B1 | 3/2004 | Hancock et al. |
| 6,701,528 B1 | 3/2004 | Arsenault et al. |
| 6,706,311 B2 | 3/2004 | Wong et al. |
| 6,708,336 B1 | 3/2004 | Bruette |
| 6,717,590 B1 | 4/2004 | Sullivan et al. |
| 6,718,552 B1 | 4/2004 | Goode |
| 6,725,461 B1 | 4/2004 | Dougherty et al. |
| 6,731,310 B2 | 5/2004 | Craycroft et al. |
| 6,732,367 B1 | 5/2004 | Ellis et al. |
| 6,732,369 B1 | 5/2004 | Schein et al. |
| 6,732,372 B2 | 5/2004 | Tomita et al. |
| 6,735,572 B2 | 5/2004 | Landesmann |
| 6,738,982 B1 | 5/2004 | Jerding |
| 6,757,909 B1 | 6/2004 | Maruo et al. |
| 6,760,918 B2 | 7/2004 | Rodriguez et al. |
| 6,769,127 B1 | 7/2004 | Bonomi et al. |
| 6,771,290 B1 | 8/2004 | Hoyle |
| 6,772,209 B1 | 8/2004 | Chernock et al. |
| 6,772,433 B1 | 8/2004 | LaJoie et al. |
| 6,782,550 B1 | 8/2004 | Cao |
| 6,791,620 B1 | 9/2004 | Elswick et al. |
| 6,792,615 B1 | 9/2004 | Rowe et al. |
| 6,801,533 B1 | 10/2004 | Barkley |
| 6,817,028 B1 | 11/2004 | Jerding et al. |
| 6,832,386 B1 | 12/2004 | Jerding et al. |
| 6,847,969 B1 | 1/2005 | Mathai et al. |
| 6,876,628 B2 | 4/2005 | Howard et al. |
| 6,898,762 B2 | 5/2005 | Ellis et al. |
| 6,901,385 B2 | 5/2005 | Okamoto et al. |
| 6,957,386 B2 | 10/2005 | Nishina et al. |
| 6,968,372 B1 | 11/2005 | Thompson et al. |
| 6,978,310 B1 | 12/2005 | Rodriguez et al. |
| 6,978,475 B1 | 12/2005 | Kunin et al. |
| 6,986,156 B1 | 1/2006 | Rodriguez et al. |
| 6,990,676 B1 | 1/2006 | Proehl et al. |
| 6,990,677 B1 | 1/2006 | Pietraszak et al. |
| 6,993,782 B1 | 1/2006 | Newberry et al. |
| 7,010,801 B1 | 3/2006 | Jerding et al. |
| 7,024,681 B1 | 4/2006 | Fransman et al. |
| 7,039,944 B1 | 5/2006 | Cho et al. |
| 7,062,466 B2 | 6/2006 | Wagner et al. |
| 7,076,734 B2 | 7/2006 | Wolff et al. |
| 7,086,077 B2 | 8/2006 | Giammaressi |
| 7,103,903 B1 | 9/2006 | Kydd |
| 7,110,714 B1 | 9/2006 | Kay et al. |
| 7,117,440 B2 | 10/2006 | Gordon et al. |
| 7,120,926 B1 | 10/2006 | Safadi et al. |
| 7,143,430 B1 | 11/2006 | Fingerman et al. |
| 7,150,031 B1 | 12/2006 | Rodriguez et al. |
| 7,155,733 B2 | 12/2006 | Rodriguez et al. |
| 7,180,422 B2 | 2/2007 | Milenkovic et al. |
| 7,185,355 B1 | 2/2007 | Ellis et al. |
| 7,188,356 B1 | 3/2007 | Miura et al. |
| 7,194,757 B1 | 3/2007 | Fish et al. |
| 7,200,857 B1 | 4/2007 | Rodriguez et al. |
| 7,237,251 B1 | 6/2007 | Oz et al. |
| 7,243,364 B2 | 7/2007 | Dunn et al. |
| 7,249,366 B1 | 7/2007 | Flavin |
| 7,324,552 B1 | 1/2008 | Galand et al. |
| 7,324,553 B1 | 1/2008 | Varier et al. |
| 7,334,251 B2 | 2/2008 | Rodriguez et al. |
| 7,340,759 B1 | 3/2008 | Rodriguez |
| 7,343,614 B1 | 3/2008 | Hendricks et al. |
| 7,356,477 B1 | 4/2008 | Allan et al. |
| 7,404,200 B1 | 7/2008 | Hailey et al. |
| 7,496,943 B1 | 2/2009 | Goldberg et al. |
| 7,496,945 B2 | 2/2009 | Rodriguez |
| 7,509,267 B1 | 3/2009 | Yarmolich et al. |
| 7,512,964 B2 | 3/2009 | Rodriguez et al. |
| 7,526,788 B2 | 4/2009 | Rodriguez |
| 7,535,888 B1 * | 5/2009 | Carlucci et al. .............. 370/352 |
| 7,647,549 B2 | 1/2010 | Denoual et al. |
| 7,673,314 B2 | 3/2010 | Ellis et al. |
| 7,685,520 B2 | 3/2010 | Rashkovskiy et al. |
| 7,707,614 B2 | 4/2010 | Krikorian et al. |
| 7,925,534 B2 | 4/2011 | Amano et al. |
| 7,934,232 B1 | 4/2011 | Jerding et al. |
| 7,961,643 B2 | 6/2011 | McDonald et al. |
| 7,962,370 B2 | 6/2011 | Rodriguez et al. |
| 7,975,277 B1 | 7/2011 | Jerding et al. |
| 7,992,163 B1 | 8/2011 | Jerding et al. |
| 7,992,166 B2 | 8/2011 | Jerding et al. |
| 8,005,713 B1 | 8/2011 | Sanz-Pastor et al. |
| 8,006,262 B2 | 8/2011 | Rodriguez et al. |
| 8,006,273 B2 | 8/2011 | Rodriguez |
| 8,020,184 B2 | 9/2011 | Jerding et al. |
| 8,032,914 B2 | 10/2011 | Rodriguez |
| 8,037,504 B2 | 10/2011 | Jerding et al. |
| 8,056,106 B2 | 11/2011 | Rodriguez et al. |
| 8,069,259 B2 | 11/2011 | Rodriguez et al. |
| 8,079,047 B1 | 12/2011 | Jerding et al. |
| 8,161,388 B2 | 4/2012 | Rodriguez et al. |
| 8,189,472 B2 | 5/2012 | McDonald et al. |
| 8,191,093 B2 | 5/2012 | Rodriguez |
| 8,255,951 B2 | 8/2012 | Jerding et al. |
| 2001/0003846 A1 | 6/2001 | Rowe et al. |
| 2001/0013125 A1 | 8/2001 | Kitsukawa et al. |
| 2001/0013127 A1 | 8/2001 | Tomita et al. |
| 2001/0029523 A1 | 10/2001 | Mcternan et al. |
| 2001/0030667 A1 | 10/2001 | Kelts |
| 2001/0032335 A1 | 10/2001 | Jones |
| 2001/0034763 A1 | 10/2001 | Jacobs et al. |
| 2001/0036271 A1 | 11/2001 | Javed |
| 2001/0044744 A1 | 11/2001 | Rhoads |
| 2002/0002642 A1 | 1/2002 | Tyson et al. |
| 2002/0007485 A1 | 1/2002 | Rodriguez et al. |
| 2002/0013836 A1 | 1/2002 | Friedman et al. |
| 2002/0026496 A1 | 2/2002 | Boyer et al. |
| 2002/0026638 A1 | 2/2002 | Eldering et al. |
| 2002/0032638 A1 | 3/2002 | Arora et al. |
| 2002/0032728 A1 | 3/2002 | Sako et al. |
| 2002/0032905 A1 | 3/2002 | Sherr et al. |

(56) References Cited

U.S. PATENT DOCUMENTS

| | | |
|---|---|---|
| 2002/0042913 A1 | 4/2002 | Ellis et al. |
| 2002/0044762 A1 | 4/2002 | Wood et al. |
| 2002/0049804 A1 | 4/2002 | Rodriguez et al. |
| 2002/0049978 A1 | 4/2002 | Rodriguez et al. |
| 2002/0056098 A1 | 5/2002 | White |
| 2002/0056118 A1 | 5/2002 | Hunter et al. |
| 2002/0057336 A1 | 5/2002 | Gaul et al. |
| 2002/0062481 A1 | 5/2002 | Slaney et al. |
| 2002/0069105 A1 | 6/2002 | do Rosario Botelho |
| 2002/0069218 A1 | 6/2002 | Sull et al. |
| 2002/0069412 A1 | 6/2002 | Philips |
| 2002/0078176 A1 | 6/2002 | Nomura et al. |
| 2002/0083443 A1 | 6/2002 | Eldering et al. |
| 2002/0087981 A1 | 7/2002 | Daniels |
| 2002/0101367 A1 | 8/2002 | Geiger et al. |
| 2002/0104083 A1 | 8/2002 | Hendricks et al. |
| 2002/0108125 A1 | 8/2002 | Joao |
| 2002/0124249 A1 | 9/2002 | Shintani et al. |
| 2002/0128908 A1 | 9/2002 | Levin et al. |
| 2002/0129362 A1 | 9/2002 | Chang et al. |
| 2003/0002862 A1 | 1/2003 | Rodriguez et al. |
| 2003/0014753 A1 | 1/2003 | Beach et al. |
| 2003/0030679 A1 | 2/2003 | Jain |
| 2003/0031465 A1 | 2/2003 | Blake |
| 2003/0037068 A1 | 2/2003 | Thomas et al. |
| 2003/0037332 A1 | 2/2003 | Chapin et al. |
| 2003/0061619 A1 | 3/2003 | Giammaressi |
| 2003/0067554 A1 | 4/2003 | Klarfeld et al. |
| 2003/0074214 A1 | 4/2003 | Kelliher |
| 2003/0074257 A1 | 4/2003 | Saveliev et al. |
| 2003/0079227 A1 | 4/2003 | Knowles et al. |
| 2003/0088872 A1 | 5/2003 | Maissel et al. |
| 2003/0101451 A1 | 5/2003 | Bentolila et al. |
| 2003/0101454 A1 | 5/2003 | Ozer et al. |
| 2003/0124973 A1 | 7/2003 | Sie et al. |
| 2003/0126425 A1 | 7/2003 | Yang et al. |
| 2003/0131356 A1 | 7/2003 | Proehl et al. |
| 2003/0135853 A1 | 7/2003 | Goldman et al. |
| 2003/0154475 A1 | 8/2003 | Rodriguez et al. |
| 2003/0154486 A1 | 8/2003 | Dunn et al. |
| 2003/0159147 A1 | 8/2003 | Young et al. |
| 2003/0174243 A1 | 9/2003 | Arbeiter et al. |
| 2003/0188313 A1 | 10/2003 | Ellis et al. |
| 2003/0193486 A1 | 10/2003 | Estrop |
| 2003/0206553 A1 | 11/2003 | Surcouf et al. |
| 2003/0219228 A1 | 11/2003 | Thiagarajan et al. |
| 2003/0221194 A1 | 11/2003 | Thiagarajan et al. |
| 2004/0034867 A1 | 2/2004 | Rashkovskiy et al. |
| 2004/0049787 A1 | 3/2004 | Maissel et al. |
| 2004/0107436 A1 | 6/2004 | Ishizaki |
| 2004/0117831 A1 | 6/2004 | Ellis et al. |
| 2004/0128685 A1 | 7/2004 | Hassell et al. |
| 2004/0133907 A1 | 7/2004 | Rodriguez et al. |
| 2004/0163117 A1 | 8/2004 | Rodriguez et al. |
| 2004/0168191 A1 | 8/2004 | Jerding et al. |
| 2004/0181801 A1 | 9/2004 | Hagen et al. |
| 2004/0221310 A1 | 11/2004 | Herrington et al. |
| 2004/0261112 A1 | 12/2004 | Hicks et al. |
| 2004/0261125 A1 | 12/2004 | Ellis et al. |
| 2005/0005308 A1* | 1/2005 | Logan et al. .................. 725/135 |
| 2005/0008074 A1 | 1/2005 | van Beek et al. |
| 2005/0028190 A1 | 2/2005 | Rodriguez et al. |
| 2005/0044565 A1 | 2/2005 | Jerding et al. |
| 2005/0044566 A1 | 2/2005 | Jerding et al. |
| 2005/0044577 A1 | 2/2005 | Jerding et al. |
| 2005/0071882 A1 | 3/2005 | Rodriguez et al. |
| 2005/0076360 A1 | 4/2005 | Jerding et al. |
| 2005/0091693 A1 | 4/2005 | Amine et al. |
| 2005/0111046 A1 | 5/2005 | Kurumisawa et al. |
| 2005/0138657 A1 | 6/2005 | Leftwich |
| 2005/0155056 A1 | 7/2005 | Knee et al. |
| 2005/0160468 A1 | 7/2005 | Rodriguez et al. |
| 2005/0188415 A1 | 8/2005 | Riley |
| 2005/0204387 A1 | 9/2005 | Knudson et al. |
| 2005/0204388 A1 | 9/2005 | Knudson et al. |
| 2005/0213506 A1 | 9/2005 | Wakumoto et al. |
| 2005/0216936 A1 | 9/2005 | Knudson et al. |
| 2005/0240961 A1 | 10/2005 | Jerding et al. |
| 2005/0251822 A1 | 11/2005 | Knowles et al. |
| 2005/0278741 A1 | 12/2005 | Robarts et al. |
| 2005/0283797 A1 | 12/2005 | Eldering et al. |
| 2005/0283810 A1 | 12/2005 | Ellis et al. |
| 2005/0289618 A1 | 12/2005 | Hardin |
| 2006/0020982 A1 | 1/2006 | Jerding et al. |
| 2006/0026080 A1 | 2/2006 | Rodriguez et al. |
| 2006/0026665 A1 | 2/2006 | Rodriguez et al. |
| 2006/0059525 A1 | 3/2006 | Jerding et al. |
| 2006/0070107 A1 | 3/2006 | Renkis |
| 2006/0088105 A1 | 4/2006 | Shen et al. |
| 2006/0112434 A1 | 5/2006 | Banker et al. |
| 2006/0206913 A1 | 9/2006 | Jerding et al. |
| 2006/0271933 A1 | 11/2006 | Agassi et al. |
| 2006/0271964 A1 | 11/2006 | Rodriguez et al. |
| 2006/0271973 A1 | 11/2006 | Jerding et al. |
| 2007/0019670 A1 | 1/2007 | Falardeau |
| 2007/0053293 A1 | 3/2007 | McDonald et al. |
| 2007/0094690 A1 | 4/2007 | Rodriguez et al. |
| 2007/0186240 A1 | 8/2007 | Ward, III et al. |
| 2008/0010658 A1 | 1/2008 | Abbott et al. |
| 2008/0046947 A1* | 2/2008 | Katznelson ................... 725/114 |
| 2008/0098421 A1 | 4/2008 | Rodriguez et al. |
| 2008/0098422 A1 | 4/2008 | Rodriguez et al. |
| 2008/0101460 A1 | 5/2008 | Rodriguez |
| 2008/0104637 A1 | 5/2008 | Rodriguez et al. |
| 2008/0137755 A1 | 6/2008 | Onur et al. |
| 2008/0155631 A1 | 6/2008 | Liwerant et al. |
| 2008/0229361 A1 | 9/2008 | Jerding et al. |
| 2008/0279217 A1 | 11/2008 | McDonald et al. |
| 2008/0281968 A1 | 11/2008 | Rodriguez |
| 2008/0282307 A1 | 11/2008 | McDonald et al. |
| 2008/0282308 A1 | 11/2008 | McDonald et al. |
| 2009/0141794 A1 | 6/2009 | Rodriguez et al. |
| 2009/0150958 A1 | 6/2009 | Jerding et al. |
| 2009/0158306 A1 | 6/2009 | Rodriguez et al. |
| 2009/0158324 A1 | 6/2009 | Rodriguez et al. |
| 2009/0158329 A1 | 6/2009 | Rodriguez et al. |
| 2009/0158331 A1 | 6/2009 | Rodriguez et al. |
| 2009/0158332 A1 | 6/2009 | Rodriguez et al. |
| 2009/0158335 A1 | 6/2009 | Rodriguez et al. |
| 2009/0158339 A1 | 6/2009 | Rodriguez et al. |
| 2009/0158352 A1 | 6/2009 | Rodriguez et al. |
| 2009/0158354 A1 | 6/2009 | Rodriguez et al. |
| 2009/0158355 A1 | 6/2009 | Rodriguez et al. |
| 2009/0158363 A1 | 6/2009 | Rodriguez et al. |
| 2009/0183081 A1 | 7/2009 | Rodriguez et al. |
| 2009/0190028 A1 | 7/2009 | Rodriguez et al. |
| 2009/0193468 A1 | 7/2009 | Rodriguez |
| 2009/0193471 A1 | 7/2009 | Rodriguez |
| 2009/0276808 A1 | 11/2009 | Jerding et al. |
| 2009/0282372 A1 | 11/2009 | Jerding et al. |
| 2009/0282440 A1 | 11/2009 | Rodriguez |
| 2010/0242063 A1 | 9/2010 | Slaney et al. |
| 2012/0188445 A1 | 7/2012 | Rodriguez et al. |
| 2012/0233654 A1 | 9/2012 | Mcdonald et al. |
| 2012/0324488 A1 | 12/2012 | Jerding et al. |

FOREIGN PATENT DOCUMENTS

| | | |
|---|---|---|
| CA | 2 475 723 | 1/2011 |
| CA | 2456318 | 2/2013 |
| EP | 0 572 090 A2 | 12/1993 |
| EP | 0 673 159 A1 | 9/1995 |
| EP | 0 680 214 A2 | 11/1995 |
| EP | 0 725 538 A2 | 8/1996 |
| EP | 0 763 936 A2 | 3/1997 |
| EP | 0 811 939 A2 | 12/1997 |
| EP | 0 838 915 A2 | 4/1998 |
| EP | 0 849 948 A2 | 6/1998 |
| EP | 0 854 645 A2 | 7/1998 |
| EP | 0 891 084 A2 | 1/1999 |
| EP | 0 896 318 A2 | 2/1999 |
| EP | 0 909 095 A1 | 4/1999 |
| EP | 0 701 756 B1 | 12/1999 |
| EP | 0 989 751 A2 | 3/2000 |

(56) References Cited

FOREIGN PATENT DOCUMENTS

| | | |
|---|---|---|
| EP | 1 069 801 A1 | 1/2001 |
| EP | 1 075 143 A1 | 2/2001 |
| EP | 1 111 572 A2 | 6/2001 |
| EP | 1 161 085 A1 | 12/2001 |
| GB | 2 343 051 A | 4/2000 |
| JP | 8-289219 | 11/1996 |
| JP | 9-322022 | 12/1997 |
| JP | 10-143734 | 5/1998 |
| JP | 11-73361 | 3/1999 |
| JP | 11-73394 | 3/1999 |
| JP | 11-164284 | 6/1999 |
| JP | 2000-101941 | 4/2000 |
| WO | WO 92/22983 | 12/1992 |
| WO | WO 94/14284 | 6/1994 |
| WO | WO 96/17467 | 6/1996 |
| WO | WO 96/33579 | 10/1996 |
| WO | WO 96/34486 | 10/1996 |
| WO | WO 96/34491 | 10/1996 |
| WO | WO 96/41477 | 12/1996 |
| WO | WO 96/41478 | 12/1996 |
| WO | WO 97/34414 | 9/1997 |
| WO | WO 98/03012 | 1/1998 |
| WO | WO 98/26528 | 6/1998 |
| WO | WO 98/31116 | 7/1998 |
| WO | WO 98/37695 | 8/1998 |
| WO | WO 98/39893 | 9/1998 |
| WO | WO 98/47279 | 10/1998 |
| WO | WO 98/48566 | 10/1998 |
| WO | WO 98/56172 | 12/1998 |
| WO | WO 98/56173 | 12/1998 |
| WO | WO 98/56188 | 12/1998 |
| WO | WO 99/01984 | 1/1999 |
| WO | WO 99/04560 | 1/1999 |
| WO | WO 99/04561 | 1/1999 |
| WO | WO 99/12109 | 3/1999 |
| WO | WO 99/14947 | 3/1999 |
| WO | WO 99/35831 | 7/1999 |
| WO | WO 99/45701 | 9/1999 |
| WO | WO 99/49717 | 10/1999 |
| WO | WO 99/52285 | 10/1999 |
| WO | WO 99/57903 | 11/1999 |
| WO | WO 99/60790 | 11/1999 |
| WO | WO 99/66719 | 12/1999 |
| WO | WO 00/02385 | 1/2000 |
| WO | WO 00/04726 | 1/2000 |
| WO | WO 00/05889 | 2/2000 |
| WO | WO 00/30354 | 5/2000 |
| WO | WO 00/40017 | 7/2000 |
| WO | WO 00/46988 | 8/2000 |
| WO | WO 00/49801 | 8/2000 |
| WO | WO 00/59202 | 10/2000 |
| WO | WO 00/60482 | 10/2000 |
| WO | WO 00/78031 A2 | 12/2000 |
| WO | WO 00/78045 A1 | 12/2000 |
| WO | WO 00/78047 A1 | 12/2000 |
| WO | WO 00/78048 A1 | 12/2000 |
| WO | WO 01/06788 A1 | 1/2001 |
| WO | WO 01/20907 A1 | 3/2001 |
| WO | WO 01/24067 A1 | 4/2001 |
| WO | WO 01/56273 A1 | 8/2001 |
| WO | WO 01/67736 A2 | 9/2001 |
| WO | WO 01/72042 A1 | 9/2001 |
| WO | WO 01/76245 A2 | 10/2001 |
| WO | WO 01/77888 A2 | 10/2001 |
| WO | WO 01/84831 A2 | 11/2001 |
| WO | WO 02/097584 A2 | 12/2002 |
| WO | WO 03/003164 A2 | 1/2003 |
| WO | WO 03/003709 A2 | 1/2003 |
| WO | WO 03/014873 A2 | 2/2003 |
| WO | WO 03/024084 A2 | 3/2003 |
| WO | WO 03/042787 A2 | 5/2003 |
| WO | WO 03/069898 A1 | 8/2003 |
| WO | WO 2004/091219 A1 | 10/2004 |
| WO | WO 2004/100500 A2 | 11/2004 |
| WO | WO 2005/059202 A1 | 6/2005 |
| WO | WO 2005/071658 A1 | 8/2005 |
| WO | WO 2007/030370 A1 | 3/2007 |

OTHER PUBLICATIONS

"A Brief History of the Trailer," http://www.movietrailertrash.com/views/history.html, 11 pages (Publicly known at least as early as Dec. 20, 2003).

"Evidence of illustrative movie release years," Retrieved from the Internet Movie Database using Internet, http://www.imdb.com, 19 pages (Retrieved on Jun. 6, 2005).

"ISO/IEC 13818-6 Information technology—Generic coding of moving pictures and associated audio information—Part 6: Extensions for DSM-CC," Chapter 4, 113 pages (Sep. 1, 1998).

"Netcaster Developer's Guide," Devedge Online Documentation, Netscape Communications Corporation, http://developer.netscape.com/docs/manuals/netcast/devguide/ index.html, XP-002166370, 82 pages (Sep. 25, 1997).

"Netscape Navigator Help," Netscape Navigator Software User Documentation, Netscape Communications Corporation, http://home.netscape.com, XP-002166369, pp. 1-63 (Aug. 10, 1997).

"Sez You . . . origin of word daemon," *Take Our Word For It,* Issue 146, p. 4, http://www.takeourword.com/TOW146/page4.html (retrieved on Apr. 4, 2006).

Alberico, G. et al., "Satellite Interactive Multimedia: A New Opportunity for Broadcasters," *International Broadcasting Convention,* Conference Publication No. 447, pp. 18-23 (Sep. 12-16, 1997).

ATI Multimedia Center 7.9, User's Guide, ATI Technologies Inc., pp. i-vi and 1-96 (Copyright 2002).

Barth et al., "10 Fernsehen am PC", Suse GMBH, XP-002324319, pp. 143-149 (2001).

Cunningham et al., "5 Das X Window System"., Suse GMBH, XP-002324320, pp. 129-180 (2001).

Definition of "flag", *Microsoft Press: Computer User's Dictionary,* 3 pages (1998).

Definition of "renting", Webster's II: New College Dictionary, 1995, Houghton Mifflin Company, p. 939.

Kevin, "Change Screen Resolution in Windows (Tips, Tricks, Tweaks, and Setting)," http://www.tacktech.com/display.cfm?t-tid=207, pp. 1-3 (Oct. 26, 2002).

Little et al., "Prospects for Interactive Video-On-Demand", IEEE Multimedia, IEEE Service Center, New York, NY US, vol. 1 No. 3, Sep. 1994, pp. 14-24, XP000476885 ISSN: 1070-986X.

McFedries, "The Complete Idiot's Guide to Windows 95," Que, 2nd Edition, p. 49 (1997).

Petit et al., "Bandwidth Resource Optimization in Video-On-Demand Network Architectures", Community Networking Integrated Multimedia Services to the Home, 1994, Proceedings of the 1st International Workshop on San Francisco, CA USA, Jul. 1994, New York, NY USA, IEEE, Jul. 1994, pp. 91-97, XP010124402 ISBN: 978-0-7803-2076-5.

Reid, Dixie, "Coming attractions before they hit the big screen, most films begin life as a trailer," *The Sacramento Bee,* Sacramento, California, p. E.1 (Jul. 18, 1996).

Remote Wonder, ATI, Tweak 3D, pp. 1-5 (Sep. 30, 2002).

Rottentomatoes web archived site, http://web.archive.org/web/20000301122211/http://rottentomatoes.com, Mar. 1, 2000, pp. 1-2.

U.S. Final Office Action cited in U.S. Appl. No. 09/947,890 mailed Nov. 24, 2009.

U.S. Non-Final Office Action cited in U.S. Appl. No. 09/947,890 mailed Apr. 10, 2009.

U.S. Final Office Action cited in U.S. Appl. No. 09/947,890 mailed Nov. 6, 2008.

U.S. Non-Final Office Action cited in U.S. Appl. No. 09/947,890 mailed Jun. 25, 2008.

U.S. Final Office Action cited in U.S. Appl. No. 10/740,138 mailed Jan. 15, 2010.

U.S. Non-Final Office Action cited in U.S. Appl. No. 10/740,138 mailed Sep. 3, 2009.

U.S. Final Office Action cited in U.S. Appl. No. 10/740,138 mailed Mar. 19, 2009.

(56) References Cited

OTHER PUBLICATIONS

U.S. Non-Final Office Action cited in U.S. Appl. No. 10/740,138 mailed Sep. 15, 2008.
U.S. Final Office Action cited in U.S. Appl. No. 10/740,138 mailed Jun. 11, 2008.
U.S. Non-Final Office Action cited in U.S. Appl. No. 10/740,138 mailed Oct. 2, 2007.
U.S. Non-final Office Action cited in U.S. Appl. No. 10/761,777 mailed Jan. 21, 2010.
U.S. Non-Final Office Action cited in U.S. Appl. No. 10/761,777 mailed Jun. 11, 2009.
U.S. Final Office Action cited in U.S. Appl. No. 10/761,777 mailed Dec. 19, 2008.
U.S. Non-Final Office Action cited in U.S. Appl. No. 10/761,777 mailed Jul. 18, 2007.
U.S. Non-Final Office Action cited in U.S. Appl. No. 10/761,777 mailed Jan. 24, 2007.
U.S. Final Office Action cited in U.S. Appl. No. 10/778,494 mailed Jul. 25, 2008.
U.S. Non-Final Office Action cited in U.S. Appl. No. 10/778,494 mailed Jan. 16, 2008.
U.S. Final Office Action cited in U.S. Appl. No. 10/778,494 mailed May 22, 2007.
U.S. Non-Final Office Action cited in U.S. Appl. No. 10/778,494 mailed Feb. 2, 2007.
U.S. Final Office Action cited in U.S. Appl. No. 10/778,494 mailed Aug. 28, 2006.
U.S. Non-Final Office Action cited in U.S. Appl. No. 10/778,494 mailed Dec. 29, 2004.
U.S. Final Office Action cited in U.S. Appl. No. 10/783,235 mailed Oct. 2, 2008.
U.S. Non-Final Office Action cited in U.S. Appl. No. 10/783,235 mailed Feb. 25, 2008.
U.S. Final Office Action cited in U.S. Appl. No. 10/934,253 mailed Dec. 23, 2009.
U.S. Non-Final Office Action cited in U.S. Appl. No. 10/934,253 mailed Jun. 26, 2009.
U.S. Final Office Action cited in U.S. Appl. No. 10/934,253 mailed Dec. 26, 2008.
U.S. Non-Final Office Action cited in U.S. Appl. No. 10/934,253 mailed Jun. 17, 2008.
U.S. Final Office Action cited in U.S. Appl. No. 10/934,253 mailed Jul. 24, 2007.
U.S. Non-Final Office Action cited in U.S. Appl. No. 10/934,253 mailed Feb. 9, 2007.
U.S. Appl. No. 09/330,792, filed Jun. 11, 1999 entitled "Series Reminders and Series Recording from an Interactive Television program Guide".
U.S. Appl. No. 09/378,533, filed Aug. 20, 1999 entitled "Electronic Program Guide with Advance Notification".
U.S. Appl. No. 09/518,041, filed Mar. 2, 2000 entitled "Apparatus and Method for Providing a Plurality of Interactive Program Guide Initial Arrangements".
U.S. Appl. No. 09/542,484, filed Apr. 3, 2000 entitled "System for Providing Alternative Services".
U.S. Appl. No. 09/565,931, filed May 4, 2000 entitled "Navigation Paradigm for Access to Television Services".
U.S. Appl. No. 09/590,434, filed Jun. 9, 2000 entitled "Video Promotional and Advertising Systems for Video on Demand System".
U.S. Appl. No. 09/590,488, filed Jun. 9, 2000 entitled "User Interface Navigational System with Parental Control for Video on Demand System".
U.S. Appl. No. 09/590,521, filed Jun. 9, 2000 entitled "Systems and Methods for Adaptive Scheduling and Dynamic Bandwidth Resource Allocation Management in a Digital Broadband Delivery System".
U.S. Appl. No. 09/590,904, filed Jun. 9, 2000 entitled "Program Information Searching System for Interactive Program Guide".
U.S. Appl. No. 09/591,356, filed Jun. 9, 2000 entitled "Future Program Options Menu System for Interactive Program Guide".
U.S. Appl. No. 09/692,920, filed Oct. 20, 2000 entitled "Media-on-Demand Title Indexing System".
U.S. Appl. No. 09/692,995, filed Oct. 20, 2000 entitled "Media-on-Demand Bookmark System".
U.S. Appl. No. 09/693,115, filed Oct. 20, 2000 entitled "Media Services Window Configuration System".
U.S. Appl. No. 09/693,288, filed Oct. 20, 2000 entitled "Media-on-Demand Rental Duration Management System".
U.S. Appl. No. 09/693,790, filed Oct. 20, 2000 entitled "Integrated Searching System for Interactive Media Guide".
VESA Plug and Display Standard, Version 1, Video Electronics Standards Association, XP-002123075, 90 pages (Jun. 11, 1997).
W3C, Putting language attributes in HTML, www.w3.org.org/International/O-help-lang, 2 pages (Apr. 29, 1997).
"Client User Interface Specification (Phase I) for Video-On-Demand Application Development on the Explorer 2000™ Digital Home Communications Terminal", Revision 1.10 (Aug. 31, 1998), 20 pages.
Addington, Timothy H., "System Architecture Specification for Video-On-Demand Application Development on the Explorer 2000™ Digital Home Communications Terminal", Revision 1.10r Review Copy (Mar. 4, 1999), 53 pages.
BPAI Decision for U.S. Appl. No. 09/692,995, mailed Aug. 20, 2008, 10 pages.
BPAI Decision for U.S. Appl. No. 09/693,288, mailed Nov. 28, 2007, 5 pages.
Canadian Office Action cited in Application No. 2,376,556 mailed Sep. 30, 2008, 4 pages.
Canadian Office Action cited in Application No. 2,376,556 mailed Nov. 23, 2007, 3 pages.
Canadian Office Action cited in Application No. 2,376,556 mailed Dec. 6, 2005, 5 pages.
Canadian Office Action cited in Application No. 2,402,088 mailed May 30, 2006, 2 pages.
Canadian Office Action cited in Application No. 2,405,491 mailed Apr. 3, 2009, 4 pages.
Canadian Office Action cited in Application No. 2,405,491 mailed May 22, 2008, 4 pages.
Canadian Office Action cited in Application No. 2,405,491 mailed Jun. 20, 2007, 4 pages.
Canadian Office Action cited in Application No. 2,405,491 mailed Jan. 20, 2006, 3 pages.
Canadian Office Action cited in Application No. 2,408,289 mailed Aug. 27, 2008, 4 pages.
Canadian Office Action cited in Application No. 2,408,289 mailed May 30, 2006, 2 pages.
Canadian Office Action cited in Application No. 2,451,477 mailed Nov. 3, 2009, 6 pages.
Canadian Office Action cited in Application No. 2,456,318 mailed May 5, 2008, 3 pages.
Canadian Office Action cited in Application No. 2,456,318 mailed Mar. 27, 2007, 2 pages.
Canadian Office Action cited in Application No. 2,459,334 mailed Apr. 16, 2009, 3 pages.
Canadian Office Action cited in Application No. 2,466,667 mailed Apr. 15, 2009, 3 pages.
Canadian Office Action cited in Application No. 2,475,723 mailed Jul. 7, 2009, 3 pages.
Canadian Office Action cited in Application No. 2,621,605 mailed Dec. 15, 2009, 6 pages.
Canadian Office Action cited in Application No. 2,554,208 mailed Apr. 1, 2010, 4 pages.
Canadian Office Action cited in Application No. 2,402,088 mailed Jun. 1, 2010, 3 pages.
Canadian Office Action cited in Application No. 2,405,491 mailed Jun. 9, 2010, 5 pages.
Canadian Office Action cited in Application No. 2,408,289 mailed Sep. 2, 2010, 3 pages.
Canadian Office Action cited in Application No. 2,451,477 mailed Oct. 20, 2010, 4 pages.
Decision on Appeal affirmed cited in U.S. Appl. No. 09/590,434 mailed May 28, 2008, 10 pages.

(56) References Cited

OTHER PUBLICATIONS

European Examination Report cited in Application No. 00 938 251.6 mailed Mar. 2, 2010, 8 pages.
European Examination Report cited in Application No. 00 938 251.6 mailed Nov. 2, 2007, 7 pages.
European Examination Report cited in Application No. 00 939 759.7 mailed May 10, 2007, 6 pages.
European Examination Report cited in Application No. 01 905 058.2 mailed Dec. 19, 2006, 5 pages.
European Examination Report cited in Application No. 01 922 261.1 mailed Jul. 18, 2008, 5 pages.
European Examination Report cited in Application No. 01 922 261.1 mailed Nov. 2, 2007, 3 pages.
European Examination Report cited in Application No. 01 922 261.1 mailed Jan. 24, 2007, 5 pages.
European Examination Report cited in Application No. 01 922 261.1 mailed May 26, 2006, 4 pages.
European Examination Report cited in Application No. 01 923 092.9 mailed Jul. 20, 2009, 6 pages.
European Examination Report cited in Application No. 01 923 092.9 mailed Nov. 27, 2008, 6 pages.
European Examination Report cited in Application No. 01 937 209.3 mailed Mar. 16, 2010, 3 pages.
European Examination Report cited in Application No. 01 937 209.3 mailed Jun. 23, 2008, 5 pages.
European Examination Report cited in Application No. 02 737 593.0 mailed May 6, 2009, 5 pages.
European Examination Report cited in Application No. 02 750 416.6 mailed Aug. 4, 2008, 3 pages.
European Examination Report cited in Application No. 02 750 416.6 mailed Aug. 28, 2007, 5 pages.
European Examination Report cited in Application No. 02 761 572.3 mailed Apr. 20, 2009, 5 pages.
European Examination Report cited in Application No. 02 761 572.3 mailed Sep. 22, 2008, 5 pages.
European Examination Report cited in Application No. 02 761 572.3 mailed Jan. 22, 2008, 4 pages.
European Examination Report cited in Application No. 02 761 572.3 mailed Aug. 29, 2007, 4 pages.
European Examination Report cited in Application No. 06 802 683.0 mailed Jun. 26, 2008, 3 pages.
Examiner's Answer to Appeal Brief cited in U.S. Appl. No. 09/590,488 mailed Jan. 11, 2008, 24 pages.
Japanese Office Action cited in Application No. 2001-581527 mailed Feb. 10, 2010, 7 pages.
Japanese Office Action cited in Application No. 2001-581527 mailed Sep. 8, 2009, 11 pages.
Leftwitch et al., "StarSight Interactive Television Program Guide—Functional/Interational Architecture Specification Document, Interaction Analysis and Design Project—Phase III," published no later than Dec. 15, 1995, 36 pages.
PCT Search Report cited in International Application No. PCT/US00/15952 mailed Jan. 16, 2001, 5 pages.
PCT Search Report cited in International Application No. PCT/US00/15963 mailed Sep. 1, 2000, 5 pages.
PCT Search Report cited in International Application No. PCT/US00/16000 mailed Oct. 2, 2000, 5 pages.
PCT Search Report cited in International Application No. PCT/US01/02490 mailed May 18, 2001, 6 pages.
PCT Search Report cited in International Application No. PCT/US01/06663 mailed Oct. 18, 2001, 5 pages.
PCT Search Report cited in International Application No. PCT/US01/10874 mailed Nov. 29, 2001, 5 pages.
PCT Search Report cited in International Application No. PCT/US01/14150 mailed Apr. 29, 2002, 7 pages.
PCT Search Report cited in International Application No. PCT/US02/20307 mailed Jan. 3, 2003, 4 pages.
PCT Search Report cited in International Application No. PCT/US02/20519 mailed Apr. 7, 2003, 5 pages.
PCT Search Report cited in International Application No. PCT/US02/24704 mailed Mar. 5, 2003, 4 pages.
PCT Search Report cited in International Application No. PCT/US02/28212 mailed Jan. 23, 2003, 4 pages.
PCT Search Report cited in International Application No. PCT/US02/36291 mailed May 23, 2003, 4 pages.
PCT Search Report cited in International Application No. PCT/US03/03391 mailed Jul. 14, 2003, 4 pages.
PCT Search Report and Written Opinion cited in International Application No. PCT/US2005/001812 mailed May 2, 2005, 15 pages.
PCT Search Report and Written Opinion cited in International Application No. PCT/US2006/033965 mailed Feb. 9, 2007, 15 pages.
PCT Search Report and Written Opinion cited in International Application No. PCT/US2006/033965 Feb. 19, 2007, 15 pages.
PCT Written Opinion cited in International Application No. PCT/US00/15952 mailed Jul. 25, 2001, 4 pages.
PCT Written Opinion cited in International Application No. PCT/US00/15963 mailed Jun. 22, 2001, 3 pages.
PCT Written Opinion cited in International Application No. PCT/US00/16000 mailed Oct. 25, 2001, 4 pages.
PCT Written Opinion cited in International Application No. PCT/US01/02490 mailed Oct. 23, 2001, 3 pages.
PCT Written Opinion cited in International Application No. PCT/US01/06663 mailed Jan. 3, 2002, 6 pages.
PCT Written Opinion cited in International Application No. PCT/US01/10874 mailed Jun. 4, 2002, 4 pages.
PCT Written Opinion cited in International Application No. PCT/US01/14150 mailed Sep. 30, 2004, 6 pages.
PCT Written Opinion cited in International Application No. PCT/US02/20307 mailed Aug. 8, 2003, 5 pages.
PCT Written Opinion cited in International Application No. PCT/US02/20519 mailed Apr. 6, 2004, 7 pages.
PCT Written Opinion cited in International Application No. PCT/US02/24704 mailed Nov. 20, 2003, 4 pages.
PCT Written Opinion cited in International Application No. PCT/US02/28212 mailed Dec. 4, 2003, 4 pages.
Reply Brief in U.S. Appl. No. 09/565,931 mailed on Sep. 17, 2007, 6 pages.
Summons to attend oral proceedings pursuant to Rule 115(1) EPC in European Application No. 02737593.0-1241 mailed May 28, 2010, 6 pages.
Supplementary European Search Report cited in European Application No. 02737593.0 mailed Mar. 3, 2009, 4 pages.
Supplementary European Search Report cited in European Application No. 02744705.1 mailed Feb. 19, 2010, 4 pages.
Supplementary European Search Report cited in European Application No. 02750416.6 mailed Jan. 2, 2007, 4 pages.
Supplementary European Search Report cited in European Application No. 02761572.3 mailed Mar. 20, 2007, 4 pages.
Supplementary European Search Report cited in European Application No. 02797096.1 mailed Oct. 14, 2005, 3 pages.
Supplementary European Search Report cited in European Application No. 03713364.2 mailed Jul. 6, 2005, 3 pages.
U.S. Final Office Action cited in U.S. Appl. No. 09/518,041 mailed Jul. 7, 2008, 10 pages.
U.S. Non-Final Office Action cited in U.S. Appl. No. 09/518,041 mailed Jan. 10, 2008, 9 pages.
U.S. Final Office Action cited in U.S. Appl. No. 09/518,041 mailed Aug. 24, 2007, 14 pages.
U.S. Non-Final Office Action cited in U.S. Appl. No. 09/518,041 mailed Feb. 6, 2007, 15 pages.
U.S. Final Office Action cited in U.S. Appl. No. 09/518,041 mailed Aug. 28, 2006, 15 pages.
U.S. Non-Final Office Action cited in U.S. Appl. No. 09/518,041 mailed Apr. 4, 2006, 13 pages.
U.S. Final Office Action cited in U.S. Appl. No. 09/518,041 mailed Sep. 15, 2005, 13 pages.
U.S. Non-Final Office Action cited in U.S. Appl. No. 09/518,041 mailed Apr. 22, 2005, 12 pages.
U.S. Final Office Action cited in U.S. Appl. No. 09/518,041 mailed Oct. 20, 2004, 25 pages.
U.S. Non-Final Office Action cited in U.S. Appl. No. 09/518,041 mailed Feb. 11, 2004, 16 pages.

(56) References Cited

OTHER PUBLICATIONS

U.S. Final Office Action cited in U.S. Appl. No. 09/518,041 mailed Aug. 27, 2003, 16 pages.
U.S. Non-Final Office Action cited in U.S. Appl. No. 09/518,041 mailed Mar. 18, 2003, 17 pages.
U.S. Final Office Action cited in U.S. Appl. No. 09/542,484 mailed Jun. 17, 2008, 21 pages.
U.S. Non-Final Office Action cited in U.S. Appl. No. 09/542,484 mailed Dec. 7, 2007, 20 pages.
U.S. Non-Final Office Action cited in U.S. Appl. No. 09/542,484 mailed Mar. 12, 2007, 17 pages.
U.S. Non-Final Office Action cited in U.S. Appl. No. 09/542,484 mailed Sep. 7, 2006, 23 page.
U.S. Final Office Action cited in U.S. Appl. No. 09/542,484 mailed Mar. 21, 2006, 26 pages.
U.S. Non-Final Office Action cited in U.S. Appl. No. 09/542,484 mailed Jul. 28, 2005, 22 pages.
U.S. Final Office Action cited in U.S. Appl. No. 09/542,484 mailed Mar. 22, 2005, 21 pages.
U.S. Non-Final Office Action cited in U.S. Appl. No. 09/542,484 mailed Apr. 1, 2004, 14 pages.
U.S. Non-Final Office Action cited in U.S. Appl. No. 09/565,931 mailed Oct. 28, 2009, 20 pages.
U.S. Final Office Action cited in U.S. Appl. No. 09/565,931 mailed Jul. 14, 2009, 18 pages.
U.S. Non-Final Office Action cited in U.S. Appl. No. 09/565,931 mailed Feb. 13, 2009, 13 pages.
U.S. Final Office Action cited in U.S. Appl. No. 09/565,931 mailed Jun. 15, 2006, 16 pages.
U.S. Non-Final Office Action cited in U.S. Appl. No. 09/565,931 mailed Jan. 11, 2006, 25 pages.
U.S. Final Office Action cited in U.S. Appl. No. 09/565,931 mailed Jul. 1, 2005, 18 pages.
U.S. Non-Final Office Action cited in U.S. Appl. No. 09/565,931 mailed Sep. 10, 2004, 22 pages.
U.S. Final Office Action cited in U.S. Appl. No. 09/590,434 mailed May 11, 2006, 17 pages.
U.S. Non-Final Office Action cited in U.S. Appl. No. 09/590,434 mailed Nov. 21, 2005, 20 pages.
U.S. Final Office Action cited in U.S. Appl. No. 09/590,434 mailed Dec. 1, 2004, 13 pages.
U.S. Non-Final Office Action cited in U.S. Appl. No. 09/590,434 mailed Apr. 22, 2004, 12 pages.
U.S. Final Office Action cited in U.S. Appl. No. 09/590,434 mailed Dec. 18, 2003, 14 pages.
U.S. Non-Final Office Action cited in U.S. Appl. No. 09/590,434 mailed May 23, 2003, 18 pages.
U.S. Final Office Action cited in U.S. Appl. No. 09/590,488 mailed Feb. 27, 2007, 17 pages.
U.S. Non-Final Office Action cited in U.S. Appl. No. 09/590,488 mailed Oct. 26, 2006, 15 pages.
U.S. Final Office Action cited in U.S. Appl. No. 09/590,488 mailed Jul. 10, 2006, 15 pages.
U.S. Non-Final Office Action cited in U.S. Appl. No. 09/590,488 mailed Dec. 20, 2005, 15 pages.
U.S. Final Office Action cited in U.S. Appl. No. 09/590,488 mailed Jun. 30, 2005, 15 pages.
U.S. Non-Final Office Action cited in U.S. Appl. No. 09/590,488 mailed Nov. 16, 2004, 9 pages.
U.S. Final Office Action cited in U.S. Appl. No. 09/590,488 mailed Jun. 7, 2004, 14 pages.
U.S. Final Office Action cited in U.S. Appl. No. 09/590,488 mailed Dec. 16, 2003, 9 pages.
U.S. Non-Final Office Action cited in U.S. Appl. No. 09/590,488 mailed Jun. 10, 2003, 34 pages.
U.S. Final Office Action cited in U.S. Appl. No. 09/590,904 mailed Sep. 13, 2007, 11 pages.
U.S. Non-Final Office Action cited in U.S. Appl. No. 09/590,904 mailed Mar. 26, 2007, 17 pages.
U.S. Final Office Action cited in U.S. Appl. No. 09/590,904 mailed Nov. 15, 2006, 15 pages.
U.S. Non-Final Office Action cited in U.S. Appl. No. 09/590,904 mailed May 31, 2006, 16 pages.
U.S. Final Office Action cited in U.S. Appl. No. 09/590,904 mailed Jan. 24, 2006, 15 pages.
U.S. Non-Final Office Action cited in U.S. Appl. No. 09/590,904 mailed Jul. 13, 2005, 14 pages.
U.S. Final Office Action cited in U.S. Appl. No. 09/590,904 mailed Jan. 11, 2005, 13 pages.
U.S. Non-Final Office Action cited in U.S. Appl. No. 09/590,904 mailed Jun. 4, 2004, 20 pages.
U.S. Final Office Action cited in U.S. Appl. No. 09/591,356 mailed Apr. 13, 2006, 15 pages.
U.S. Non-Final Office Action cited in U.S. Appl. No. 09/591,356 mailed Dec. 20, 2005, 16 pages.
U.S. Final Office Action cited in U.S. Appl. No. 09/591,356 mailed Jun. 30, 2005, 21 pages.
U.S. Final Office Action cited in U.S. Appl. No. 09/591,356 mailed May 10, 2004, 13 pages.
U.S. Non-Final Office Action cited in U.S. Appl. No. 09/591,356 mailed Jan. 14, 2004, 9 pages.
U.S. Final Office Action cited in U.S. Appl. No. 09/591,356 mailed Sep. 26, 2003, 9 pages.
U.S. Non-Final Office Action cited in U.S. Appl. No. 09/591,356 mailed May 21, 2003, 20 pages.
U.S. Final Office Action cited in U.S. Appl. No. 09/692,920 mailed Jul. 22, 2008, 17 pages.
U.S. Non-Final Office Action cited in U.S. Appl. No. 09/692,920 mailed Jan. 17, 2008, 44 pages.
U.S. Final Office Action cited in U.S. Appl. No. 09/692,920 mailed Jun. 14, 2007, 25 pages.
U.S. Non-Final Office Action cited in U.S. Appl. No. 09/692,920 mailed Nov. 24, 2006, 24 pages.
U.S. Final Office Action cited in U.S. Appl. No. 09/692,920 mailed Jun. 21, 2006, 25 pages.
U.S. Non-Final Office Action cited in U.S. Appl. No. 09/692,920 mailed Feb. 16, 2006, 26 pages.
U.S. Final Office Action cited in U.S. Appl. No. 09/692,920 mailed Jun. 17, 2005, 22 pages.
U.S. Non-Final Office Action cited in U.S. Appl. No. 09/692,920 mailed Nov. 18, 2004, 13 pages.
U.S. Final Office Action cited in U.S. Appl. No. 09/692,995 mailed Sep. 4, 2009, 25 pages.
U.S. Non-Final Office Action cited in U.S. Appl. No. 09/692,995 mailed Jan. 23, 2009, 20 pages.
U.S. Final Office Action cited in U.S. Appl. No. 09/692,995 mailed Sep. 8, 2006, 15 pages.
U.S. Non-Final Office Action cited in U.S. Appl. No. 09/692,995 mailed Mar. 27, 2006, 19 pages.
U.S. Final Office Action cited in U.S. Appl. No. 09/692,995 mailed Sep. 21, 2005, 28 pages.
U.S. Final Office Action cited in U.S. Appl. No. 09/692,995 mailed May 3, 2005, 33 pages.
U.S. Non-Final Office Action cited in U.S. Appl. No. 09/692,995 mailed Oct. 21, 2004, 28 pages.
U.S. Final Office Action cited in U.S. Appl. No. 09/692,995 mailed Apr. 26, 2004, 24 pages.
U.S. Non-Final Office Action cited in U.S. Appl. No. 09/692,995 mailed Dec. 5, 2003, 18 pages.
U.S. Final Office Action cited in U.S. Appl. No. 09/693,115 mailed Jan. 25, 2005, 18 pages.
U.S. Non-Final Office Action cited in U.S. Appl. No. 09/693,115 mailed Jun. 16, 2004, 15 pages.
U.S. Final Office Action cited in U.S. Appl. No. 09/693,115 mailed Feb. 9, 2004, 20 pages.
U.S. Non-Final Office Action cited in U.S. Appl. No. 09/693,115 mailed Sep. 26, 2003, 14 pages.
U.S. Final Office Action cited in U.S. Appl. No. 09/693,288 mailed Dec. 1, 2005, 18 pages.
U.S. Non-Final Office Action cited in U.S. Appl. No. 09/693,288 mailed Jul. 19, 2005, 17 pages.

(56) References Cited

OTHER PUBLICATIONS

U.S. Final Office Action cited in U.S. Appl. No. 09/693,288 mailed Feb. 10, 2005, 9 pages.
U.S. Non-Final Office Action cited in U.S. Appl. No. 09/693,288 mailed Jul. 15, 2004, 16 pages.
U.S. Final Office Action cited in U.S. Appl. No. 09/693,288 mailed Feb. 26, 2004, 13 pages.
U.S. Non-Final Office Action cited in U.S. Appl. No. 09/693,288 mailed Oct. 27, 2003, 15 pages.
U.S. Final Office Action cited in U.S. Appl. No. 09/693,790 mailed Jul. 25, 2008, 15 pages.
U.S. Non-Final Office Action cited in U.S. Appl. No. 09/693,790 mailed Jan. 15, 2008, 11 pages.
U.S. Final Office Action cited in U.S. Appl. No. 09/693,790 mailed Jun. 19, 2007, 12 pages.
U.S. Non-Final Office Action cited in U.S. Appl. No. 09/693,790 mailed Dec. 28, 2006, 10 pages.
U.S. Final Office Action cited in U.S. Appl. No. 09/693,790 mailed Jun. 16, 2006, 21 pages.
U.S. Final Office Action cited in U.S. Appl. No. 09/693,790 mailed Dec. 28, 2005, 18 pages.
U.S. Final Office Action cited in U.S. Appl. No. 09/693,790 mailed Jun. 21, 2005, 22 pages.
U.S. Non-Final Office Action cited in U.S. Appl. No. 09/693,790 mailed Oct. 6, 2004, 19 pages.
U.S. Final Office Action cited in U.S. Appl. No. 09/881,516 mailed Jun. 3, 2005, 41 pages.
U.S. Non-Final Office Action cited in U.S. Appl. No. 09/881,516 mailed Dec. 29, 2004, 30 pages.
U.S. Final Office Action cited in U.S. Appl. No. 09/881,516 mailed Jul. 26, 2004, 36 pages.
U.S. Final Office Action cited in U.S. Appl. No. 09/881,516 mailed Apr. 21, 2004, 34 pages.
U.S. Non-Final Office Action cited in U.S. Appl. No. 09/881,516 mailed Oct. 28, 2003, 30 pages.
U.S. Final Office Action cited in U.S. Appl. No. 09/894,508 mailed Sep. 17, 2009, 12 pages.
U.S. Non-Final Office Action cited in U.S. Appl. No. 09/894,508 mailed Feb. 4, 2009, 11 pages.
U.S. Non-Final Office Action cited in U.S. Appl. No. 09/894,508 mailed Jun. 13, 2008, 7 pages.
U.S. Final Office Action cited in U.S. Appl. No. 09/894,508 mailed Dec. 31, 2007, 8 pages.
U.S. Non-Final Office Action cited in U.S. Appl. No. 09/894,508 mailed Jul. 26, 2007, 6 pages.
U.S. Non-Final Office Action cited in U.S. Appl. No. 09/896,231 mailed Nov. 17, 2009, 21 pages.
U.S. Non-Final Office Action cited in U.S. Appl. No. 09/896,231 mailed Jun. 3, 2009, 21 pages.
U.S. Non-Final Office Action cited in U.S. Appl. No. 09/896,231 mailed Dec. 23, 2008, 17 pages.
U.S. Final Office Action cited in U.S. Appl. No. 09/896,231 mailed Dec. 29, 2005, 30 pages.
U.S. Non-Final Office Action cited in U.S. Appl. No. 09/896,231 mailed Jun. 23, 2005, 33 pages.
U.S. Final Office Action cited in U.S. Appl. No. 09/924,111 mailed Aug. 7, 2008, 8 pages.
U.S. Non-Final Office Action cited in U.S. Appl. No. 09/924,111 mailed Jan. 29, 2008, 8 pages.
U.S. Final Office Action cited in U.S. Appl. No. 09/924,111 mailed Oct. 5, 2007, 9 pages.
U.S. Non-Final Office Action cited in U.S. Appl. No. 09/924,111 mailed Apr. 19, 2007, 9 pages.
U.S. Final Office Action cited in U.S. Appl. No. 09/924,111 mailed Sep. 18, 2006, 14 pages.
U.S. Non-Final Office Action cited in U.S. Appl. No. 09/924,111 mailed Mar. 15, 2006, 13 pages.
U.S. Final Office Action cited in U.S. Appl. No. 09/947,890 mailed Nov. 24, 2009, 15 pages.
U.S. Non-Final Office Action cited in U.S. Appl. No. 09/947,890 mailed Apr. 10, 2009, 14 pages.
U.S. Final Office Action cited in U.S. Appl. No. 09/947,890 mailed Nov. 6, 2008, 16 pages.
U.S. Non-Final Office Action cited in U.S. Appl. No. 09/947,890 mailed Jun. 25, 2008, 17 pages.
U.S. Final Office Action cited in U.S. Appl. No. 10/740,138 mailed Jan. 15, 2010, 26 pages.
U.S. Non-Final Office Action cited in U.S. Appl. No. 10/740,138 mailed Sep. 3, 2009, 25 pages.
U.S. Final Office Action cited in U.S. Appl. No. 10/740,138 mailed Mar. 19, 2009, 25 pages.
U.S. Non-Final Office Action cited in U.S. Appl. No. 10/740,138 mailed Sep. 15, 2008, 21 pages.
U.S. Final Office Action cited in U.S. Appl. No. 10/740,138 mailed Jun. 11, 2008, 17 pages.
U.S. Non-Final Office Action cited in U.S. Appl. No. 10/740,138 mailed Oct. 2, 2007, 16 pages.
U.S. Non-final Office Action cited in U.S. Appl. No. 10/761,777 mailed Jan. 21, 2010, 21 pages.
U.S. Non-Final Office Action cited in U.S. Appl. No. 10/761,777 mailed Jun. 11, 2009, 19 pages.
U.S. Final Office Action cited in U.S. Appl. No. 10/761,777 mailed Dec. 19, 2008, 16 pages.
U.S. Non-Final Office Action cited in U.S. Appl. No. 10/761,777 mailed Jul. 18, 2007, 22 pages.
U.S. Non-Final Office Action cited in U.S. Appl. No. 10/761,777 mailed Jan. 24, 2007, 20 pages.
U.S. Final Office Action cited in U.S. Appl. No. 10/778,494 mailed Jul. 25, 2008, 15 pages.
U.S. Non-Final Office Action cited in U.S. Appl. No. 10/778,494 mailed Jan. 16, 2008, 14 pages.
U.S. Final Office Action cited in U.S. Appl. No. 10/778,494 mailed May 22, 2007, 15 pages.
U.S. Non-Final Office Action cited in U.S. Appl. No. 10/778,494 mailed Feb. 2, 2007, 14 pages.
U.S. Final Office Action cited in U.S. Appl. No. 10/778,494 mailed Aug. 28, 2006, 15 pages.
U.S. Non-Final Office Action cited in U.S. Appl. No. 10/778,494 mailed Dec. 29, 2004, 11 pages.
U.S. Final Office Action cited in U.S. Appl. No. 10/783,235 mailed Oct. 2, 2008, 6 pages.
U.S. Non-Final Office Action cited in U.S. Appl. No. 10/783,235 mailed Feb. 25, 2008, 10 pages.
U.S. Final Office Action cited in U.S. Appl. No. 10/934,253 mailed Dec. 23, 2009, 10 pages.
U.S. Non-Final Office Action cited in U.S. Appl. No. 10/934,253 mailed Jun. 26, 2009, 9 pages.
U.S. Final Office Action cited in U.S. Appl. No. 10/934,253 mailed Dec. 26, 2008, 9 pages.
U.S. Non-Final Office Action cited in U.S. Appl. No. 10/934,253 mailed Jun. 17, 2008, 9 pages.
U.S. Final Office Action cited in U.S. Appl. No. 10/934,253 mailed Jul. 24, 2007, 8 pages.
U.S. Non-Final Office Action cited in U.S. Appl. No. 10/934,253 mailed Feb. 9, 2007, 7 pages.
U.S. Non-Final Office Action cited in U.S. Appl. No. 10/934,253 mailed Sep. 14, 2006, 9 pages.
U.S. Final Office Action cited in U.S. Appl. No. 10/957,849 mailed Aug. 8, 2008, 9 pages.
U.S. Non-Final Office Action cited in U.S. Appl. No. 10/957,849 mailed Apr. 30, 2008, 12 pages.
U.S. Final Office Action cited in U.S. Appl. No. 10/957,854 mailed Apr. 1, 2010, 19 pages.
U.S. Non-Final Office Action cited in U.S. Appl. No. 10/957,854 mailed Sep. 28, 2009, 15 pages.
U.S. Final Office Action cited in U.S. Appl. No. 10/957,854 mailed Apr. 7, 2009, 9 pages.
U.S. Non-Final Office Action cited in U.S. Appl. No. 10/957,854 mailed Oct. 15, 2008, 12 pages.
U.S. Non-Final Office Action cited in U.S. Appl. No. 10/957,854 mailed Apr. 30, 2008, 10 pages.

(56) References Cited

OTHER PUBLICATIONS

U.S. Final Office Action cited in U.S. Appl. No. 10/957,942 mailed Jul. 28, 2009, 14, pages.
U.S. Non-Final Office Action cited in U.S. Appl. No. 10/957,942 mailed Jan. 14, 2009, 13 pages.
U.S. Final Office Action cited in U.S. Appl. No. 10/957,942 mailed Jul. 31, 2008, 13 pages.
U.S. Non-Final Office Action cited in U.S. Appl. No. 10/957,942 mailed May 1, 2008, 11 pages.
U.S. Final Office Action cited in U.S. Appl. No. 10/981,053 mailed Jan. 21, 2010, 20 pages.
U.S. Non-Final Office Action cited in U.S. Appl. No. 10/981,053 mailed Apr. 15, 2009, 16 pages.
U.S. Final Office Action cited in U.S. Appl. No. 10/981,053 mailed Aug. 6, 2008, 16 pages.
U.S. Non-Final Office Action cited in U.S. Appl. No. 10/891,053 mailed Jan. 2, 2008, 16 pages.
U.S. Final Office Action cited in U.S. Appl. No. 10/994,599 mailed Dec. 1, 2006, 15 pages.
U.S. Non-Final Office Action cited in U.S. Appl. No. 10/994,599 mailed May 16, 2006, 13 pages.
U.S. Final Office Action cited in U.S. Appl. No. 10/994,599 mailed Jan. 26, 2006, 12 pages.
U.S. Non-Final Office Action cited in U.S. Appl. No. 10/994,599 mailed Aug. 23, 2005, 15 pages.
U.S. Final Office Action cited in U.S. Appl. No. 11/162,345 mailed Mar. 16, 2010, 27 pages.
U.S. Non-Final Office Action cited in U.S. Appl. No. 11/162,345 mailed Aug. 21, 2009, 39 pages.
U.S. Final Office Action cited in U.S. Appl. No. 11/162,345 mailed Mar. 9, 2009, 37 pages.
U.S. Non-Final Office Action cited in U.S. Appl. No. 11/162,345 mailed Oct. 31, 2008, 44 pages.
U.S. Final Office Action cited in U.S. Appl. No. 11/170,348 mailed Feb. 1, 2010, 12 pages.
U.S. Non-Final Office Action cited in U.S. Appl. No. 11/170,348 mailed Sep. 30, 2009, 10 pages.
U.S. Final Office Action cited in U.S. Appl. No. 11/170,348 mailed May 28, 2009, 10 pages.
U.S. Non-Final Office Action cited in U.S. Appl. No. 11/170,348 mailed Dec. 11, 2008, 22 pages.
U.S. Final Office Action cited in U.S. Appl. No. 11/208,387 mailed Dec. 22, 2008, 19 pages.
U.S. Non-Final Office Action cited in U.S. Appl. No. 11/208,387 mailed Jun. 12, 2008, 20 pages.
U.S. Non-Final Office Action cited in U.S. Appl. No. 11/238,369 mailed Mar. 30, 2010, 13 pages.
U.S. Non-Final Office Action cited in U.S. Appl. No. 11/244,621 mailed Feb. 5, 2010, 12 pages.
U.S. Final Office Action cited in U.S. Appl. No. 11/244,621 mailed Sep. 17, 2009, 10 pages.
U.S. Non-Final Office Action cited in U.S. Appl. No. 11/244,621 mailed Mar. 19, 2009, 13 pages.
U.S. Non-Final Office Action cited in U.S. Appl. No. 11/244,621 mailed Sep. 19, 2008, 11 pages.
U.S. Non-Final Office Action cited in U.S. Appl. No. 11/275,245 mailed Oct. 22, 2009, 16 pages.
U.S. Final Office Action cited in U.S. Appl. No. 11/275,245 mailed Jul. 29, 2009, 16 pages.
U.S. Non-Final Office Action cited in U.S. Appl. No. 11/275,245 mailed Sep. 22, 2008, 22 pages.
U.S. Final Office Action cited in U.S. Appl. No. 11/460,516 mailed Mar. 18, 2010, 18 pages.
U.S. Non-Final Office Action cited in U.S. Appl. No. 11/460,516 mailed Jun. 26, 2009, 19 pages.
U.S. Final Office Action cited in U.S. Appl. No. 11/460,516 mailed Feb. 13, 2009, 18 pages.
U.S. Non-Final Office Action cited in U.S. Appl. No. 11/460,516 mailed Sep. 17, 2008, 14 pages.
U.S. Non-Final Office Action cited in U.S. Appl. No. 11/496,303 mailed Mar. 2, 2010, 16 pages.
U.S. Non-Final Office Action cited in U.S. Appl. No. 11/496,303 mailed Sep. 29, 2009, 18 pages.
U.S. Final Office Action cited in U.S. Appl. No. 11/496,303 mailed Apr. 1, 2009, 16 pages.
U.S. Non-Final Office Action cited in U.S. Appl. No. 11/496,303 mailed Sep. 18, 2008, 14 pages.
U.S. Final Office Action cited in U.S. Appl. No. 11/564,431 mailed Jan. 4, 2010, 17 pages.
U.S. Non-Final Office Action cited in U.S. Appl. No. 11/564,431 mailed Aug. 24, 2009, 16 pages.
U.S. Non-Final Office Action cited in U.S. Appl. No. 12/127,968 mailed Mar. 31, 2010, 15 pages.
U.S. Final Office Action cited in U.S. Appl. No. 12/127,968 mailed Dec. 1, 2009, 14 pages.
U.S. Non-Final Office Action cited in U.S. Appl. No. 12/127,968 mailed Apr. 30, 2009, 17 pages.
U.S. Non-Final Office Action cited in U.S. Appl. No. 12/179,752 mailed Dec. 23, 2009, 13 pages.
U.S. Non-Final Office Action cited in U.S. Appl. No. 12/179,767 mailed Jan. 22, 2010, 30 pages.
U.S. Non-Final Office Action cited in U.S. Appl. No. 12/372,887 mailed Oct. 16, 2009, 21 pages.
U.S. Non-Final Office Action cited in U.S. Appl. No. 12/372,894 mailed Oct. 27, 2009, 6 pages.
U.S. Non-Final Office Action cited in U.S. Appl. No. 12/372,917 mailed Oct. 26, 2009, 18 pages.
U.S. Non-Final Office Action cited in U.S. Appl. No. 12/388,139 mailed Dec. 15, 2009, 24 pages.
U.S. Non-Final Office Action cited in U.S. Appl. No. 12/389,564 mailed Nov. 10, 2009, 14 pages.
U.S. Non-Final Office Action cited in U.S. Appl. No. 12/413,686 mailed Nov. 30, 2009, 14 pages.
U.S. Restriction Requirement cited in U.S. Appl. No. 11/162,345 mailed Jul. 3, 2008, 7 pages.
U.S. Non-Final Office Action cited in U.S. Appl. No. 10/934,253 mailed Apr. 27, 2010, 10 pages.
U.S. Non-Final Office Action cited in U.S. Appl. No. 11/275,245 mailed May 5, 2010, 21 pages.
U.S. Final Office Action cited in U.S. Appl. No. 12/372,887 mailed Apr. 14, 2010, 27 pages.
U.S. Final Office Action cited in U.S. Appl. No. 12/372,917 mailed May 17, 2010, 19 pages.
U.S. Final Office Action cited in U.S. Appl. No. 12/389,564 mailed Apr. 28, 2010, 10 pages.
U.S. Non-Final Office Action cited in U.S. Appl. No. 09/693,288 mailed Jun. 21, 2010, 22 pages.
U.S. Final Office Action cited in U.S. Appl. No. 09/896,231 mailed May 28, 2010, 21 pages.
U.S. Non-Final Office Action cited in U.S. Appl. No. 10/740,138 mailed Oct. 27, 2010, 23 pages.
U.S. Final Office Action cited in U.S. Appl. No. 10/761,777 mailed Aug. 2, 2010, 22 pages.
U.S. Non-Final Office Action cited in U.S. Appl. No. 10/934,253 mailed Nov. 4, 2010, 10 pages.
U.S. Non-Final Office Action cited in U.S. Appl. No. 10/957,942 mailed Jun. 30, 2010, 22 pages.
U.S. Non-Final Office Action cited in U.S. Appl. No. 11/170,348 mailed Oct. 26, 2010, 13 pages.
U.S. Non-Final Office Action cited in U.S. Appl. No. 11/234,967 mailed Sep. 10, 2010, 10 pages.
U.S. Final Office Action cited in U.S. Appl. No. 11/238,369 mailed Aug. 31, 2010, 18 pages.
U.S. Final Office Action cited in U.S. Appl. No. 11/244,621 mailed Aug. 18, 2010, 15 pages.
U.S. Final Office Action cited in U.S. Appl. No. 11/496,303 mailed Jul. 22, 2010, 22 pages.
U.S. Non-Final Office Action cited in U.S. Appl. No. 11/564,431 mailed Jul. 20, 2010, 17 pages.
U.S. Non-Final Office Action cited in U.S. Appl. No. 11/963,942 mailed Jun. 8, 2010, 20 pages.

(56) References Cited

OTHER PUBLICATIONS

U.S. Non-Final Office Action cited in U.S. Appl. No. 11/963,945 mailed Jul. 16, 2010, 16 pages.
U.S. Non-Final Office Action cited in U.S. Appl. No. 11/963,951 mailed Aug. 2, 2010, 15 pages.
U.S. Final Office Action cited in U.S. Appl. No. 12/127,968 mailed Sep. 14, 2010, 24 pages.
U.S. Final Office Action cited in U.S. Appl. No. 12/179,767 mailed Aug. 20, 2010, 27 pages.
U.S. Non-Final Office Action cited in U.S. Appl. No. 12/180,416 mailed Jun. 25, 2010, 11 pages.
U.S. Non-Final Office Action cited in U.S. Appl. No. 12/388,002 mailed Sep. 3, 2010, 18 pages.
U.S. Final Office Action cited in U.S. Appl. No. 12/388,139 mailed Jul. 6, 2010, 23 pages.
U.S. Final Office Action cited in U.S. Appl. No. 12/389,128 mailed Nov. 9, 2010, 50 pages.
U.S. Non-Final Office Action cited in U.S. Appl. No. 12/389,128 mailed Jun. 2, 2010, 14 pages.
U.S. Non-Final Office Action cited in U.S. Appl. No. 12/389,564 mailed Aug. 23, 2010, 16 pages.
U.S. Non-Final Office Action cited in U.S. Appl. No. 12/390,418 mailed Sep. 28, 2010, 13 pages.
U.S. Non-Final Office Action cited in U.S. Appl. No. 12/390,420 mailed Oct. 19, 2010, 12 pages.
U.S. Non-Final Office Action cited in U.S. Appl. No. 12/390,422 mailed Oct. 20, 2010, 13 pages.
U.S. Final Office Action cited in U.S. Appl. No. 12/413,686 mailed Jun. 10, 2010, 18 pages.
Canadian Office Action cited in Application No. 2,456,318 mailed Nov. 17, 2010, 4 pages.
U.S. Non-Final Office Action cited in U.S. Appl. No. 12/179,763 mailed Jan. 4, 2011, 18 pages.
U.S. Non-Final Office Action cited in U.S. Appl. No. 12/389,564 mailed Jan. 21, 2011, 13 pages.
Canadian Office Action dated May 31, 2011 cited in Application No. 2,621,605, 2 pages.
Canadian Office Action dated Jul. 11, 2011 cited in Application No. 2,554,208, 4 pages.
European Office Action dated Oct. 10, 2011 cited in Application No. 02744705.1, 9 pages.
Canadian Office Action dated Oct. 17, 2011 cited in Application No. 2,402,088, 4 pages.
Summons to attend oral proceedings mailed Dec. 29, 2011 in Application No. 00939759.7, 9 pages.
Summons to attend oral proceedings mailed Jul. 31, 2012 in Application No. 02744705.1, 5 pages.
European Communication dated Nov. 14, 2012 in Application No. 09154377.7, 6 pages.
U.S. Non-Final Office Action cited in U.S. Appl. No. 10/934,253 mailed Apr. 29, 2011, 11 pages.
U.S. Final Office Action cited in U.S. Appl. No. 12/389,564 mailed May 19, 2011, 15 pages.
U.S. Non-Final Office Action cited in U.S. Appl. No. 10/740,138 mailed Jun. 8, 2011, 26 pages.
U.S. Final Office Action cited in U.S. Appl. No. 11/170,348 mailed Jun. 9, 2011, 14 pages.
U.S. Non-Final Office Action mailed Dec. 26, 2012 in U.S. Appl. No. 12/413,686, 9 pages.
"Industry Leading Software Vendors Endorse BroadVision's Next Generation of Retail and Business-To-Business E-Commerce Application Solutions," PR Newswire, Jun. 14, 1999, 4 pages.
U.S. Final Office Action cited in U.S. Appl. No. 09/693,288 mailed Feb. 8, 2011, 28 pages.
U.S. Non-Final Office Action cited in U.S. Appl. No. 11/162,345 mailed Feb. 1, 2011, 33 pages.
U.S. Non-Final Office Action cited in U.S. Appl. No. 12/413,686 mailed Mar. 17, 2011, 20 pages.
Canadian Office Action cited in Application No. 2,459,334 mailed Mar. 4, 2011, 3 pages.
Summons to attend oral proceedings in EP Application No. 01937209.3 mailed Mar. 21, 2011, 7 pages.
U.S. Non-Final Office Action cited in U.S. Appl. No. 10/761,777 mailed Apr. 12, 2011, 20 pages.

* cited by examiner

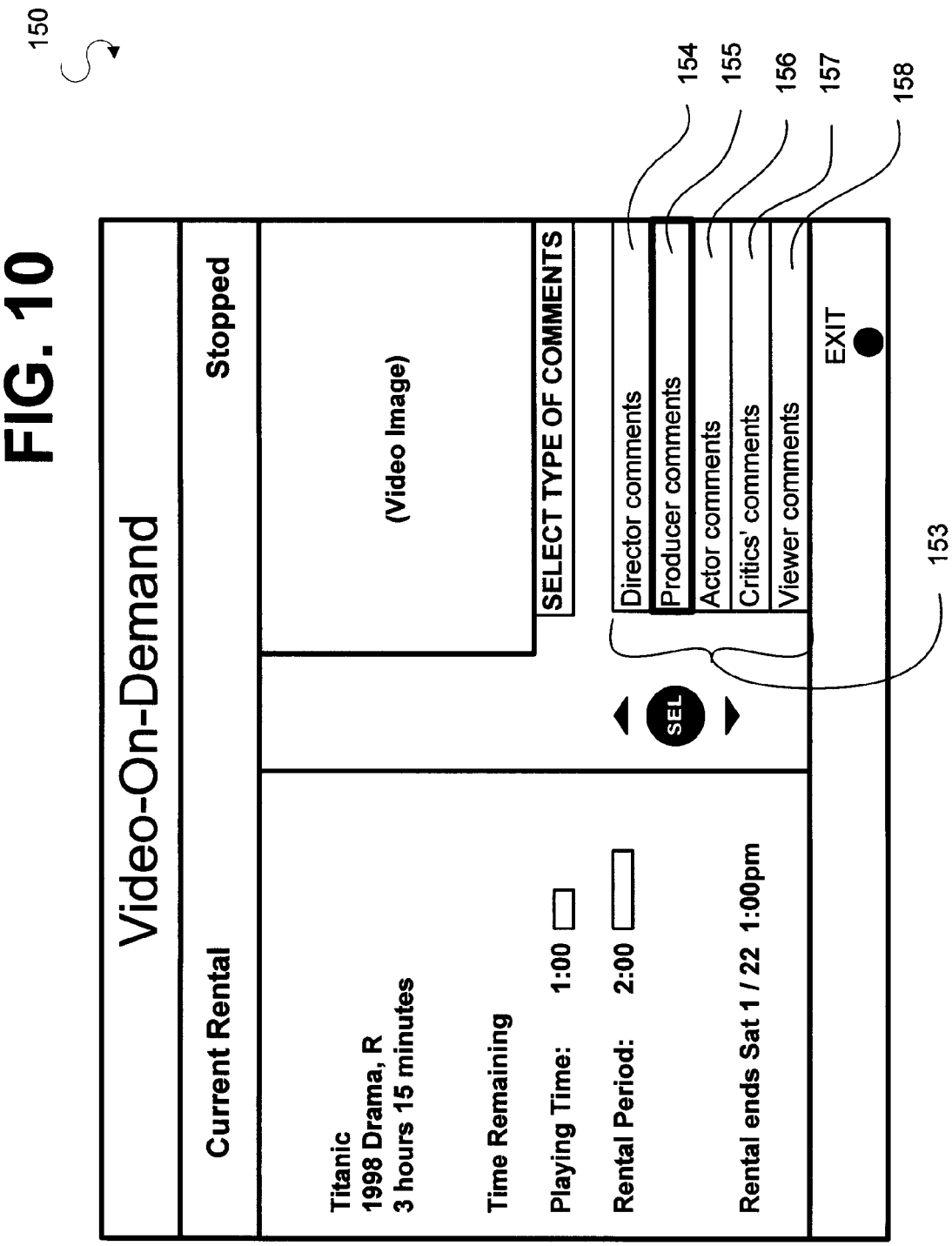

US 8,707,153 B2

DISPLAYING COMMENT DATA CORRESPONDING TO A VIDEO PRESENTATION

CROSS-REFERENCE TO RELATED APPLICATIONS

This application is a continuation of application Ser. No. 09/693,780, filed Oct. 20, 2000 now U.S. Pat. No. 7,200,857, which is a continuation-in-part of application Ser. No. 09/590,520, filed on Jun. 9, 2000 now U.S. Pat. No. 7,010,801 and which claims the benefit of U.S. Provisional Application Ser. No. 60/214,987, filed on Jun. 29, 2000, each of which is entirely incorporated herein by reference.

FIELD OF THE INVENTION

This invention relates in general to television systems, and more particularly, to the field of media on demand.

BACKGROUND OF THE INVENTION

With recent advances in digital transmission technology, cable television systems are now capable of providing much more than the traditional analog broadcast video. In implementing enhanced programming, the home communication terminal ("HCT"), otherwise known as the set-top box, has become an important computing device for accessing video services and navigating a subscriber through a maze of available services. In addition to supporting traditional analog broadcast video functionality, digital HCTs (or "DHCTs") now also support an increasing number of two-way digital services such as video-on-demand.

Typically, a DHCT is connected to a cable or satellite television network and includes hardware and software necessary to provide the functionality of the digital television system at the client's site. Preferably, some of the software executed by a DHCT is downloaded and/or updated via the cable television network. Each DHCT also typically includes a processor, communication components and memory, and is connected to a television or other display device, such as a personal computer. While many conventional DHCTs are stand-alone devices that are externally connected to a television, a DHCT and/or its functionality may be integrated into a television or personal computer, as will be appreciated by those of ordinary skill in the art.

As the number of video-on-demand movie choices increases, it is becoming increasingly important for video-on-demand providers to distinguish their video presentations by providing viewers with more options or features, along with the video-on-demand presentations, that will make the viewing experience more entertaining for the viewers. In addition, many viewers today are interested in knowing more about the movies that they are watching but simply do not have enough free time to locate and read such information. Therefore there exists a need to make the video-on-demand viewing experience more informative and entertaining.

BRIEF DESCRIPTION OF THE DRAWINGS

The invention can be better understood with reference to the following drawings. The components in the drawings are not necessarily drawn to scale, emphasis instead being placed upon clearly illustrating the principles of the present invention. In the drawings, like reference numerals designate corresponding parts throughout the several views.

FIG. 10 depicts a comments selection window after the user requests added comments via the stopped video window depicted in FIG. 9.

DETAILED DESCRIPTION OF THE PREFERRED EMBODIMENT

Figure 1:
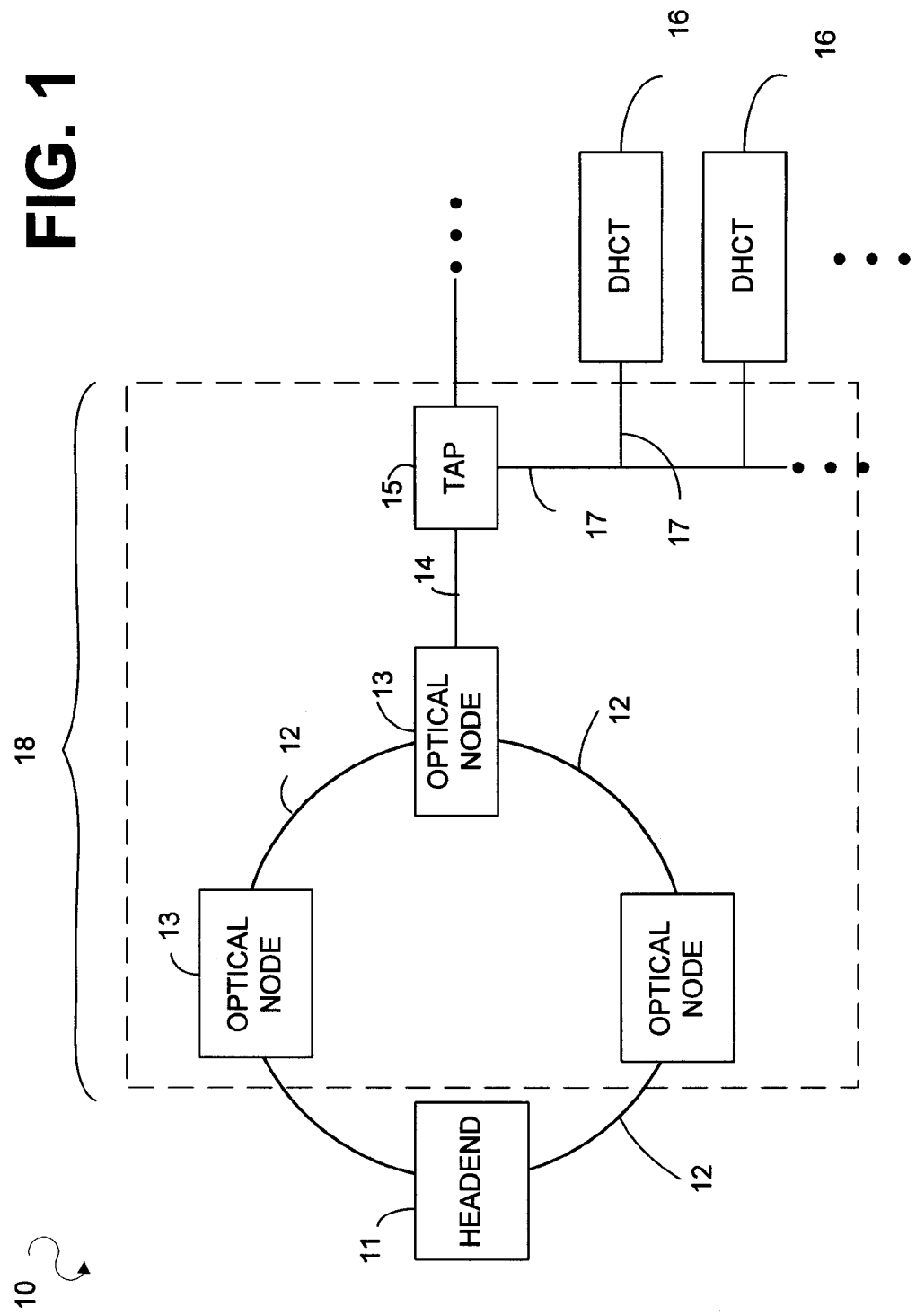
FIG. 1 depicts a block diagram of a cable television system in accordance with one preferred embodiment of the present invention.

FIG. 1 is a block diagram of a cable television system 10 that includes a headend 11 connected through a network 18 to multiple DHCTs 16. The headend 11 receives and generates television signals and transmits them as optical signals over fiber optic cables 12. One or more optical nodes 13 are included in the system 10 for converting the optical signals to Radio Frequency (RF) signals that are thereafter routed over other media, such as coaxial cables 14. Taps 15 are provided within the cable system 10 for splitting the RF signal off, via cables 17, to subscriber equipment such as DHCTs 16, cable-ready television sets, video recorders, or computers. It should be appreciated, however, that the cable television system 10 shown in FIG. 1 is merely illustrative and should not be construed as implying any limitations upon the scope of the present invention.

Figure 2:
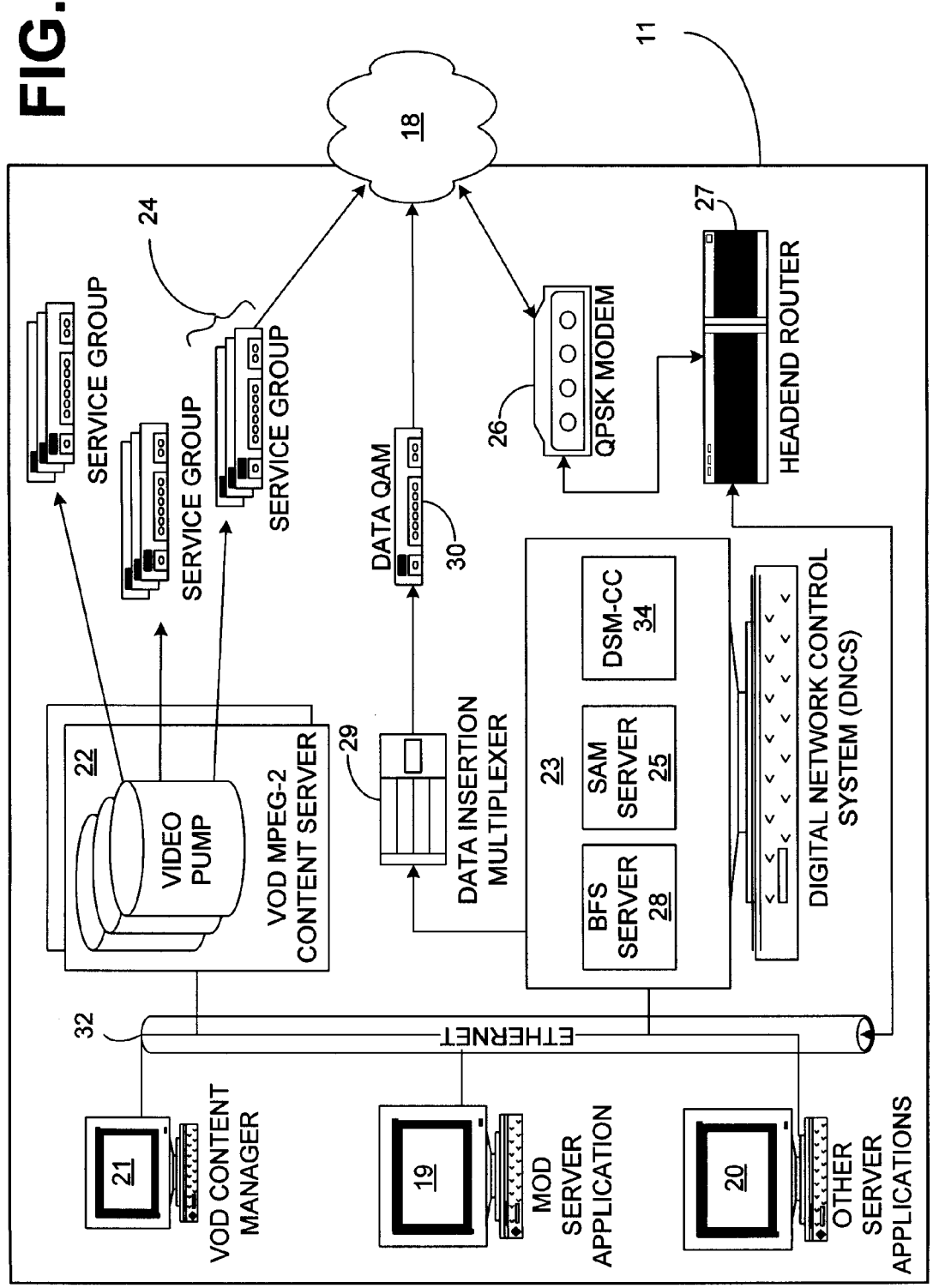
FIG. 2 depicts a diagram of the headend 11 as depicted in FIG. 1.

FIG. 2 is a block diagram of portions of a headend 11 that is configured to provide media-on-demand (MOD) services in accordance with one embodiment of the present invention. MOD services include, among other things, video-on-demand (VOD) services and respective MOD information suitable to be presented to a user via display of an interactive media guide. MOD server application 19 and a plurality of other server applications 20 are connected to a digital network control system (DNCS) 23 via a high-speed network such as an Ethernet connection 32. The MOD server application 19 is responsible for reserving and configuring system resources needed to provide MOD services and for providing configuration and service data to an MOD client application 63 (FIG.

3), including MOD information comprising a catalog of titles available for on-demand viewing and/or on-demand rental by a user.

The DNCS 23 provides complete management, monitoring, and control of the network's elements and broadcast services provided to users. In one implementation, the DNCS 23 uses a data insertion multiplexer 29 and a data QAM 30 to insert in-band broadcast file system (BFS) data into an MPEG-2 transport stream that is broadcast and received via DHCT's communication interface 42 and tuner system 45. The DNCS 23 also contains a session manager 34 that uses Digital Storage Media Command and Control (DSMCC) protocol to set up and maintain MOD sessions. The session manager 34 processes user to network (U-N) session signaling messages, manages allocation of session-related network resources, supports network management operations, acts as a point of contact to the network for the DHCT's 16 in the network 18 to establish individual sessions, and supports MOD services by providing the signaling interface to establish, maintain and release client initiated exclusive sessions.

A service application manager (SAM) server 25 is a server component of a client-server pair of components, with the client component being located at the DHCT 16. Together, the client-server SAM components provide a system in which the user can access services, which are identified by an application to run and a parameter, such as particular data content, specific to that service. The client-server SAM components also manage the life cycle of the applications on the system, including the definition, activation, and suspension of services they provide and the downloading of the applications into the DHCT 16 as necessary. MPEG-2 transport may be used to multiplex video, audio, and data in digital transmission channels such as channels transmitted downstream employing quadrature amplitude modulation (QAM). An MPEG-2 transport stream allows multiplexing of digital video, digital audio, and data. Multiple different video programs, each with one or more digital video streams, one or more digital audio streams, and/or multiple data streams can be multiplexed and transmitted over the same 6 MHz (or 8 MHz) RF frequency in which the DHCT's tuner tunes to. Hence, a digital transmission channel can carry the video, audio and data streams of programs of multiple television (TV) stations or on-demand video programs.

Applications on both the headend 11 and the DHCT 16 can access the data stored in a broadcast file system (BFS) server 28 in a similar manner to a file system found on operating systems. The BFS server 28 is a part of a broadcast file system that has a counterpart BFS client module 43 (FIG. 3) in a DHCT 16 connected to the network 18. The BFS server 28 repeatedly sends data for applications on a data carousel (not shown) over a period of time in cyclical repeated fashion so that a DHCT 16 that is in need of reading any particular data file or parts thereof may receive it when requested by a user or one or more of its internal running processes.

A VOD content manager 21 is responsible for managing the content on the VOD content servers 22. The MOD server application 19 controls both the VOD content manager 21 and the VOD content servers 22 and utilizes them to help deliver the video and audio streams that make up VOD services. In one embodiment, an MOD content manager and MOD content servers (not shown) could run respectively in parallel to the VOD content manager 21 and VOD content servers 22 to manage other types of on-demand media content. In an alternate embodiment an MOD content manager replaces the VOD content manager 21 and the MOD content servers replaces the VOD content servers 22. The QAM modulators that comprise the QAM group 24 receive the MPEG-2 transport streams from the VOD content servers 22, convert them into encrypted RF signals at a specified frequency (channel), and transmit them to a DHCT 16 via the network 18.

The QPSK modem 26 is responsible for transporting the out-of-band IP (internet protocol) datagram traffic between the distribution headend 11 and a DHCT 16. Data from the QPSK modem 26 is routed by headend router 27 within the headend 11. The headend router 27 is also responsible for delivering upstream application traffic to the various server applications 19 & 20.

Figure 3:
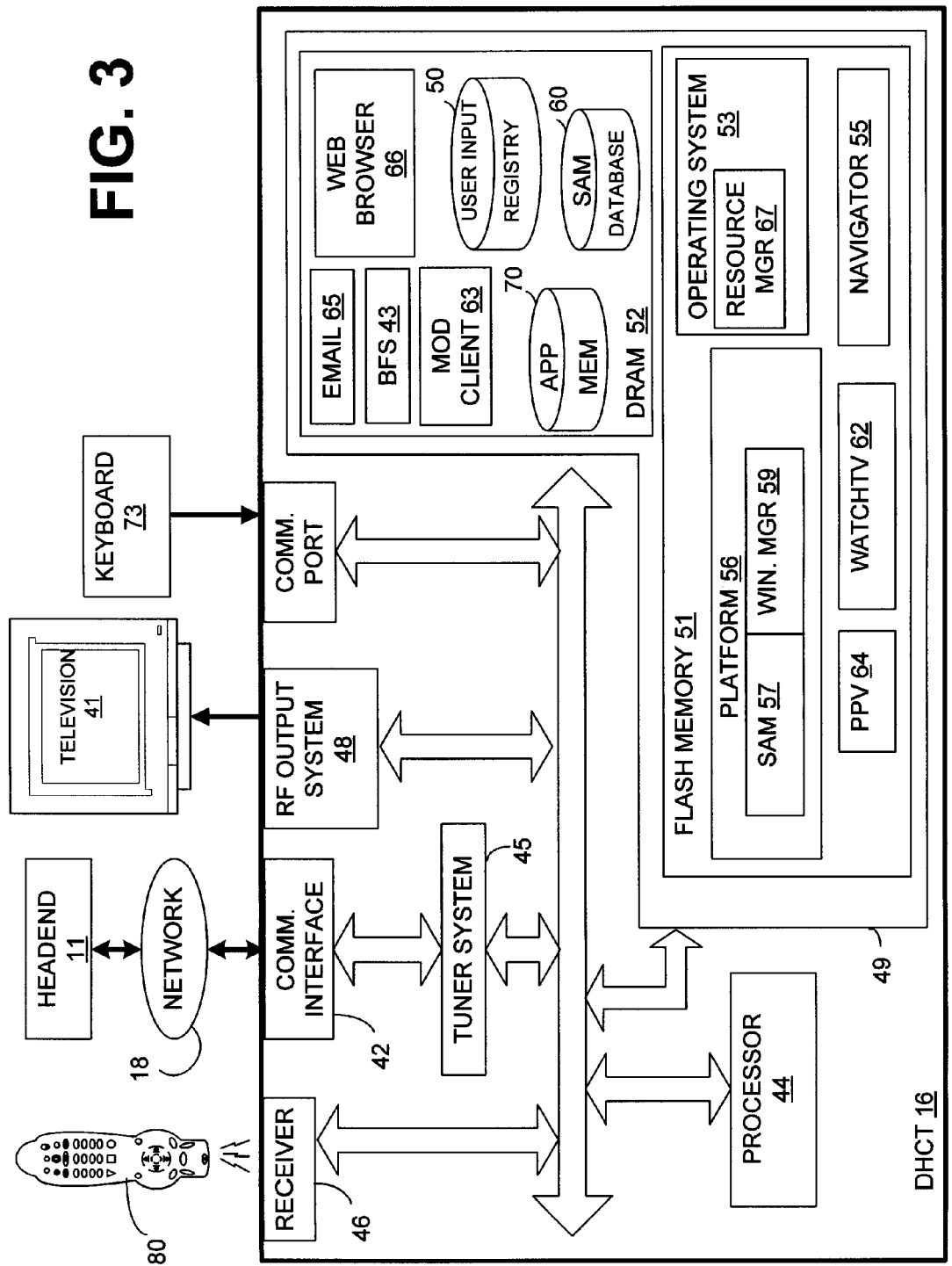
FIG. 3 depicts a block diagram of selected elements of a DHCT and related equipment, in accordance with one preferred embodiment of the present invention depicted in FIG. 1.

FIG. 3 is a block diagram illustrating a DHCT 16 that is coupled to a headend 11 and to a television 41. Some of the functionality performed by applications executed in the DHCT 16 (such as the MOD client application 63) may instead be performed at the headend 11 and vice versa. A DHCT 16 is typically situated at a user's residence or place of business and may be a stand alone unit or integrated into another device such as, for example, a television set or a personal computer. The DHCT 16 preferably includes a communications interface 42 for receiving signals (video, audio and/or other data) from the headend 11 through the network 18 and for providing any reverse information to the headend 11 through the network 18. The DHCT 16 further includes at least one processor 44 for controlling operations of the DHCT 16, an RF output system 48 for driving the television display 41, and a tuner system 45 for tuning into a particular television channel to be displayed and for sending and receiving various types of data or media from the headend 11. The tuner system 45 includes, in one implementation, an out-of-band tuner for bi-directional quadrature phase shift keying (QPSK) data communication and a quadrature amplitude modulation (QAM) tuner for receiving television signals. Additionally, a receiver 46 receives externally-generated information, such as user inputs or commands from other devices.

The DHCT 16 may also include one or more wireless or wired interfaces, also called ports, for receiving and/or transmitting data to other devices. For instance, the DHCT 16 may feature USB (Universal Serial Bus), Ethernet (for connection to a computer), IEEE-1394 (for connection to media devices in an entertainment center), serial, and/or parallel ports. The user inputs may, for example, be provided by a computer or transmitter with buttons or keys located either on the exterior of the terminal or by a hand-held remote control device or keyboard that includes user-actuated buttons. In one implementation, the DHCT 16 includes system memory 49, which includes flash memory 51 and dynamic random access memory (DRAM) 52, for storing various applications, modules and data for execution and use by the processor 44. Basic functionality of the DHCT 16 is provided by an operating system 53 that is primarily stored in flash memory 51. Among other things, the operating system 53 includes at least one resource manager 67 that provides an interface to resources of the DHCT 16 such as, for example, computing resources.

An application referred to as navigator 55 is also resident in flash memory 51 for providing a navigation framework for services provided by the DHCT 16. The navigator 55 registers for and in some cases reserves certain user inputs related to navigational keys such as channel increment/decrement, last channel, favorite channel, etc. The client applications may be resident in flash memory 51 or downloaded into DRAM 52. The navigator 55 also provides users with television related menu options that correspond to DHCT functions such as, for example, providing an interactive program guide, blocking a channel or a group of channels from being displayed in a channel menu, and displaying a video-on-demand purchase list.

The flash memory 51 also contains a platform library 56. The platform library 56 is a collection of utilities useful to applications, such as a timer manager, a compression manager, a configuration manager, an HTML parser, a database manager, a widget toolkit, a string manager, and other utilities (not shown). These utilities are accessed by applications via application programming interfaces (APIs) as necessary so that each application does not have to contain these utilities. Two components of the platform library 56 that are shown in FIG. 3 are a window manager 59 and a service application manager client (SAM) 57.

The window manager 59 provides a mechanism for implementing the sharing of the screen regions and user input. The window manager 59 on the DHCT 16 is responsible for, as directed by one or more applications, implementing the creation, display, and de-allocation of the limited DHCT 16 screen resources. It allows multiple applications to share the screen by assigning ownership of screen regions, or windows. The window manager 59 also maintains, among other things, a user input registry 50 in DRAM 52 so that when a user enters a key or a command via the remote control device 80 or another input device such as a keyboard or mouse, the user input registry 50 is accessed to determine which of various applications running on the DHCT 16 should receive data corresponding to the input key and in which order. As an application is executed, it registers a request to receive certain user input keys or commands. When the user presses a key corresponding to one of the commands on the remote control device 80, the command is received by the receiver 46 and relayed to the processor 44. The processor 44 dispatches the event to the operating system 53 where it is forwarded to the window manager 59 which ultimately accesses the user input registry 50 and routes data corresponding to the incoming command to the appropriate application.

The SAM client 57 is a client component of a client-server pair of components, with the server component being located on the headend 11. A SAM database 60 in DRAM 52 includes a data structure of services and a data structure of channels that are created and updated by the headend 11. Many services can be defined using the same application component, with different parameters. Examples of services include, without limitation and in accordance with one implementation, presenting television programs (available through a WatchTV application 62), pay-per-view events (available through a PPV application 64), digital music (not shown), media-on-demand (available through an MOD application 63), and an interactive program guide. In general, the identification of a service includes the identification of an executable application that provides the service along with a set of application-dependent parameters that indicate to the application the service to be provided. As a non-limiting example, a service of presenting a television program could be executed with a set of parameters to view HBO or with a separate set of parameters to view CNN. Each association of the application component (tune video) and one parameter component (HBO or CNN) represents a particular service that has a unique service I.D. The SAM client 57 also interfaces with the resource manager 67, as discussed below, to control resources of the DHCT 16.

Application clients can also be downloaded into DRAM 52 at the request of the SAM client 57, typically in response to a request by the user or in response to a message from the headend. In this non-limiting example DRAM 52 contains a media-on-demand application (MOD) 63, an e-mail application 65, and a web browser application 66, among others (not shown). It should be clear to one with ordinary skill in the art that these applications are not limiting and merely serve as examples for this present embodiment of the invention. Furthermore, one or more DRAM based applications may, as an alternative embodiment, be resident in flash memory 51. These applications, and others provided by the cable system operator, are top level software entities on the network for providing services to the user.

In one implementation, applications executing on the DHCT 16 work with the navigator 55 by abiding by several guidelines. First, an application utilizes the SAM client 57 for the provision, activation, and suspension of services. Second, an application shares DHCT 16 resources with other applications and abides by the resource management policies of the SAM client 57, the operating system 53, and the DHCT 16. Third, an application handles situations where resources are only available with navigator 55 intervention. Fourth, when an application loses service authorization while providing a service, the application suspends the service via the SAM (the navigator 55 will reactivate an individual service application when it later becomes authorized). Finally, an application client is designed to not have access to certain user input keys reserved by the navigator (i.e., power, channel +/−, volume +/−, etc.).

The MOD client application 63 provides the user with lists of available media titles to choose from and with video presentations requested by the user. The MOD client application 63 provides video presentations to the user by engaging, preferably, in a direct two-way IP (Internet Protocol) connection with VOD content servers 22 (FIG. 2).

Figure 3A:
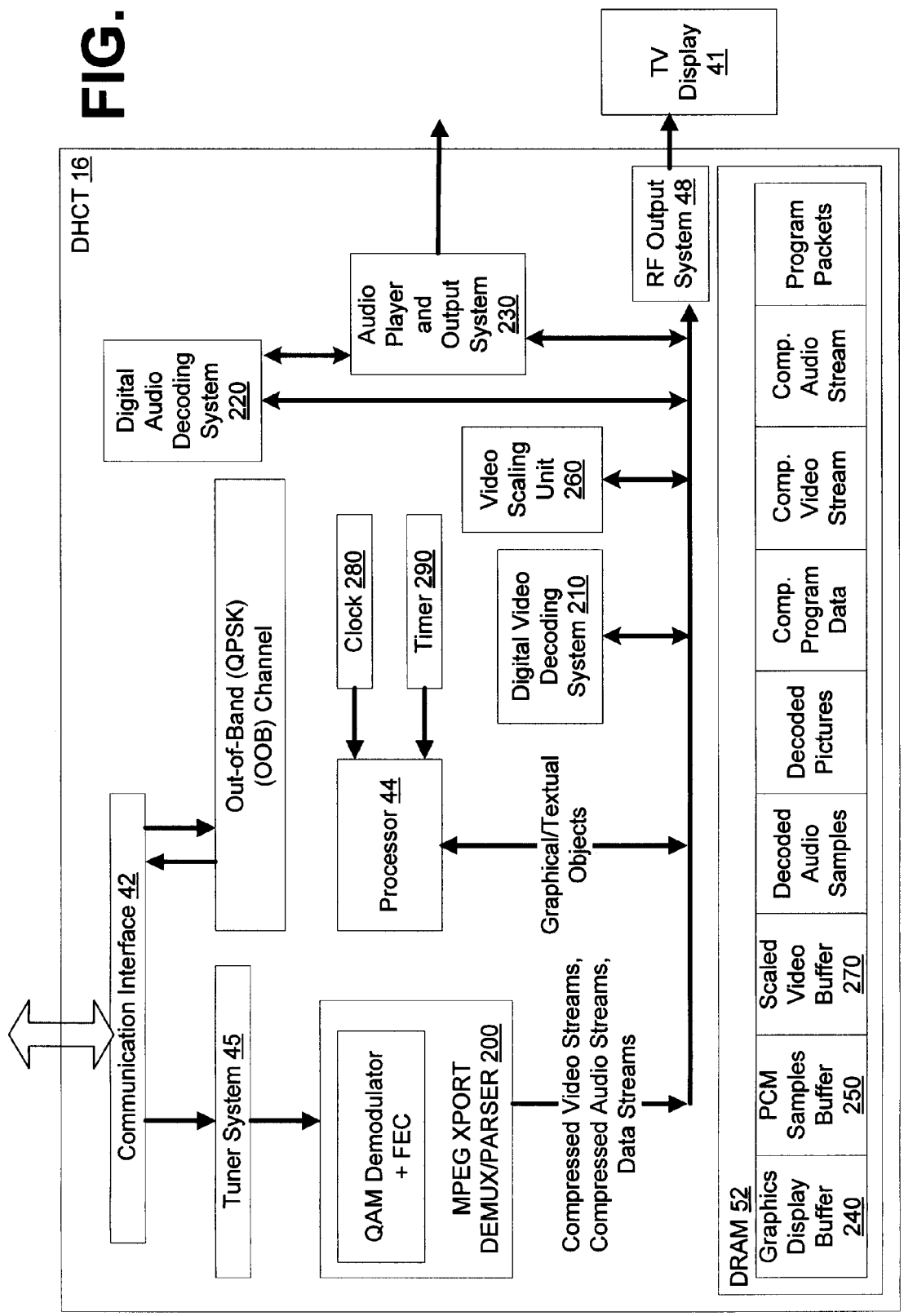
FIG. 3A is another depiction of a block diagram of selected elements of a DHCT in accordance with one preferred embodiment of the present invention depicted in FIG. 1.

FIG. 3A is another depiction of selected elements of DHCT 16. DHCT 16 includes a tuner system 45 that can select one of a plurality of transmission channels provided by a broadband network such as a Digital cable TV network or a Digital Broadband Delivery System (DBDS). Tuner system 45 enables the DHCT of the present invention to tune to downstream media and data transmissions, thereby allowing a user to receive digital or analog video programs and associated content transmitted in the downstream transmission via the DBDS.

The DHCT 16 includes demultiplexing system 200 comprising functionality for QAM demodulation, forward error correction (FEC), transport demultiplexing and parsing. Transport demultiplexing may include MPEG-2 transport demultiplexing. The DHCT 16 also includes a digital video decoding system 210, a digital audio decoding system 220, a display output system such as RF output system 48, an "audio player and output system" 230 that can feed audio samples to RF output system 48, and a processor 44.

The demultiplexing system 200 in communication with communication interface 42, tuner system 45 and processor 44 effects reception of compressed video streams, compressed audio streams, and data streams corresponding to a first video program to be separated from other programs and/or streams transported in the tuned transmission channel and to be stored in a first part of DRAM 52 of DHCT 16 assigned to receive packets of a first video program.

The demultiplexing system 200 in communication with the digital video decoding system 210 and processor 44 effect notification and/or transfer of received packets of one or more compressed video streams corresponding to a first video program from a first part of DRAM 52 to a second part of DRAM 52 assigned to digital video decoding system 210.

The demultiplexing system 200 in communication with the digital audio decoding system 220 and processor 44 effects notification and/or transfer of received packets of one or more compressed audio streams corresponding to a first video program from a first part of DRAM 52 to a third part of DRAM 52 assigned to digital audio decoding system 220.

The demultiplexing system 200 in communication with processor 44 and/or other data parsing and interpretation device (not shown) in DHCT 16 effects notification and/or transfer of received packets of one or more data streams corresponding to a first video program from a first part of DRAM 52 to a fourth part of DRAM 52 assigned for reception of data affiliated with a first video program.

The digital video decoding system 210 reads compressed video stored in a second part of DRAM 52 assigned to digital video decoding system 210 and effects decompression and reconstruction of compressed digital video streams into an assigned fifth part of DRAM 52, and in communication with the display output system (such as RF output system 48) effects presentation of video pictures in television 41.

The digital audio decoding system 220 reads compressed audio stored in a third part of DRAM 52 assigned to the digital audio decoding system 220 and effects decompression and reconstruction of compressed digital audio streams into an assigned sixth part of DRAM 52, and in communication with the audio player and output system 230 effects presentation of audio sample to television 41 and/or other audio output interfaces (not shown) in DHCT 16.

An executable program or algorithm corresponding to an operating system (OS) component, or to a client platform component, or to a client application, or to respective parts thereof, can reside in and execute out of DRAM 52 and/or flash memory 51. Likewise, data inputted into or outputted from any executable program can reside in DRAM 52 or flash memory 51. Furthermore, an executable program or algorithm corresponding to an OS component, or to a client platform component, or to a client application, or to respective parts thereof, can reside in flash memory 51, or in a local storage device connected to DHCT 16 and can be transferred into DRAM 52 for execution. Likewise, data input for an executable program can reside in flash memory 51 or a storage device and can be transferred into DRAM 52 for use by an executable program or algorithm. In addition, data outputted by an executable program can be written into DRAM 52 by an executable program or algorithm and can be transferred into flash memory 51 or into a storage device for storage purposes. The present invention is not limited by where or how data and/or applications are stored or retrieved.

Each of the above mentioned applications comprises executable instructions for implementing logical functions and can be embodied in any computer-readable medium for use by or in connection with an instruction execution system, apparatus, or device, such as a computer-based system, processor-containing system, or other system that can fetch and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner, and then stored in a computer memory.

Figure 4:
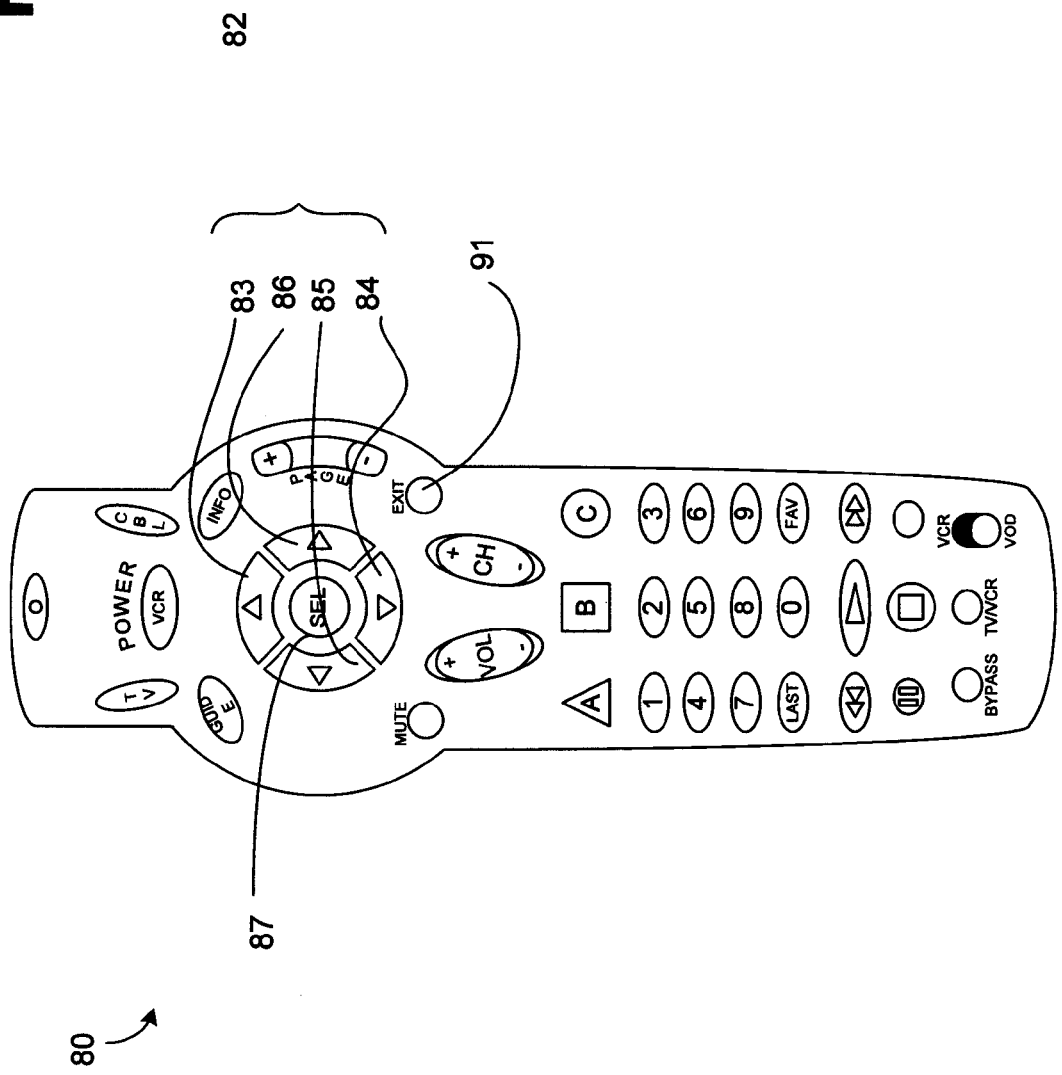
FIG. 4 depicts a remote control device that can be used to provide user input to the DHCT shown in FIG. 3.

FIG. 4 is a non limiting example of a remote control device 80 that is used to provide user input to the DHCT 16. The arrow buttons 82 include an up arrow button 83, a down arrow button 84, a left arrow button 85, and a right arrow button 86 that are used to scroll through options and/or to highlight an option. The select button 87 may be used to select a currently highlighted option that is provided to the user. Other buttons that are available on the remote control device will be discussed further below. Many alternative methods of providing user input may be used including a remote control device with different buttons and/or button layouts, a keyboard device, a voice activated device, etc. The invention described herein is not limited by the type of device used to provide user input.

Figure 5:
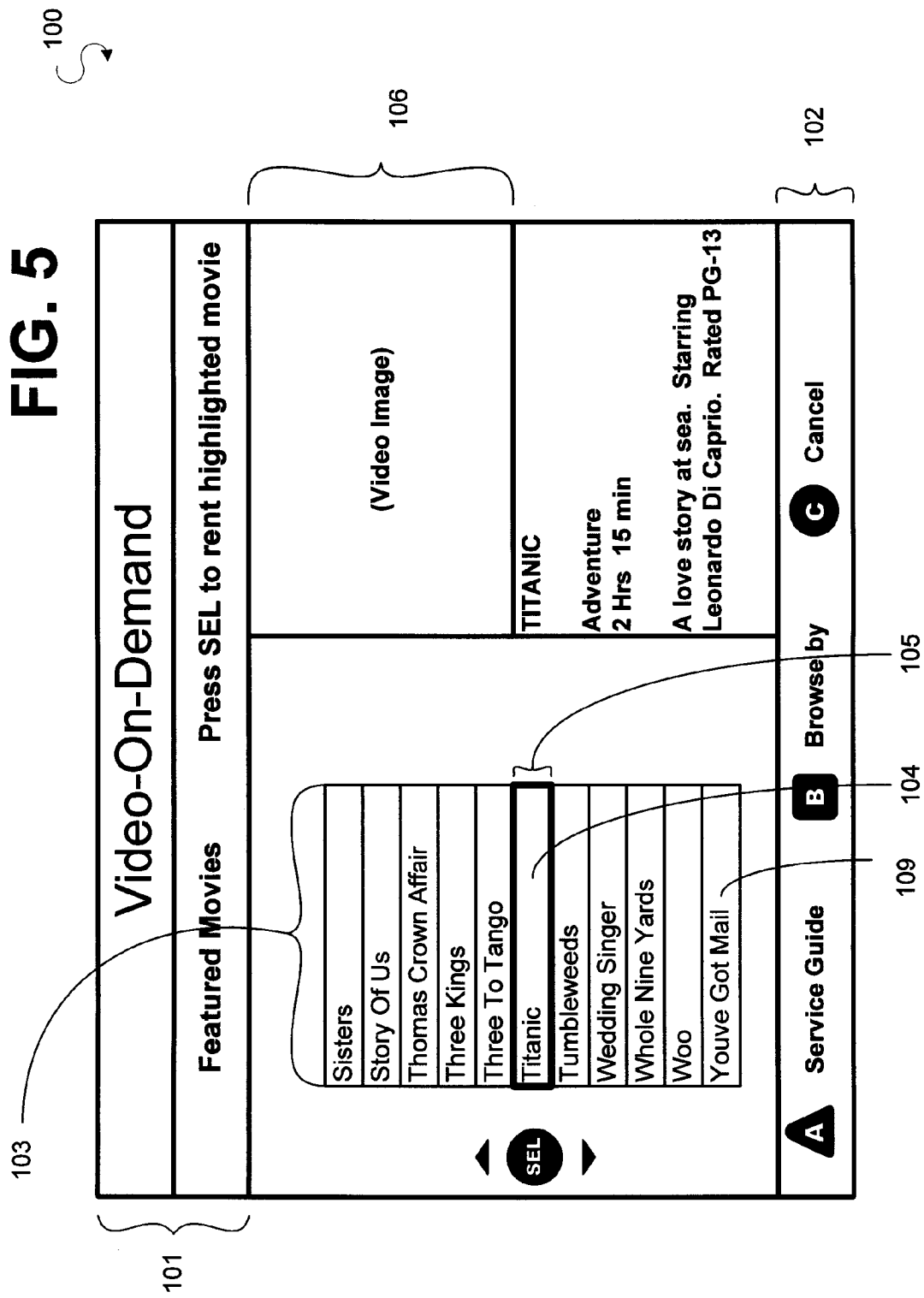
FIG. 5 depicts an example video-on-demand (VOD) rental selection window that illustrates a media rental list presented to the user by the DHCT shown in FIG. 3.

With continued reference to FIGS. 3, 3A and 4 throughout the remaining figures, FIG. 5 depicts an example VOD rental selection window 100. As with other window examples discussed below, processor 44 executes program instructions of MOD client application 63 that cause it to direct the window manager 59 to create window 100 via display data that is formatted for television 41. Processor 44 stores the display data or parts thereof in DRAM 52 (as necessary) and transfers the display data to a display output system such as RF output system 48 wherein display data is converted to respective television signals and transmitted to television 41. Of course, the scope of the invention also includes any other method of causing the described windows to appear to the user.

A user may utilize the rental selection window 100 in order to request a video-on-demand rental. Top portion 101 of example window 100 typically contains one or more headings, while the bottom portion 102 typically illustrates relevant navigation buttons available on the remote control device 80. Video rental list 103 contains the titles of video presentations, such as video title 104, that are available for rent as well as a highlighted title area 105.

A user may scroll through the video rental list using the up and down arrow buttons 83, 84 on the remote control device 80 and may request a currently highlighted video title by activating the select button 87. For example, a user may activate the down arrow button 84 on the remote control device 80 until the selection "You've Got Mail" 109 is displayed in the highlighted title area 105 and then request to see the video titled "You've Got Mail" 109 by activating the select button 87. In an alternative embodiment, activating the up and down arrow buttons 83, 84 on the remote control device 80 results in the shifting of the highlighted title area 105 rather that the shifting of the video titles (at least until the top or bottom video titles are reached). A reduced screen area 106 displays an image corresponding to the video title displayed in the highlighted title area 105. As the user scrolls through the video rental list 103, the image displayed in the reduced screen area 106 changes accordingly. Without any limitation to other scrolling and selection forms, the scrolling and selection mechanism described above is similarly applicable to other lists and windows herein.

Figure 6:
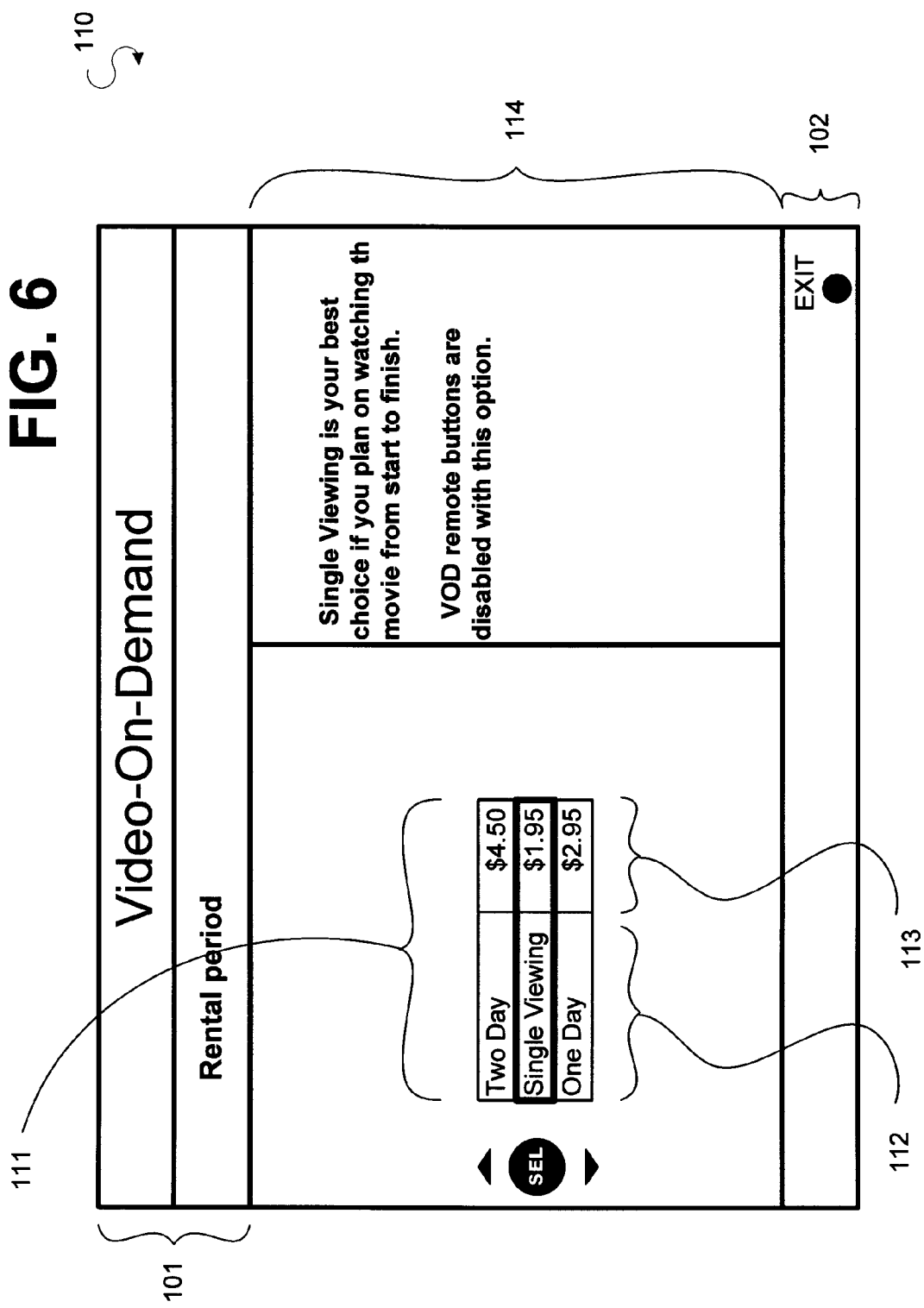
FIG. 6 depicts an example rental period selection window that is presented to the user after the user selects a media rental via the rental selection window shown in FIG. 5.

FIG. 6 depicts an example rental period selection window 110 that is presented to a user after the user selects a movie from the rental selection window 100. The user is presented with a rental period list 111 containing rental periods 112, rental prices 113, and a highlighted selection area 113. Rental period information section 114 provides information about the rental period displayed in the highlighted selection area. A user may scroll to the desired rental period until it becomes highlighted and may then select a highlighted rental period by activating the select button 87 or may cancel the rental request by activating the exit button 91.

Figure 7:
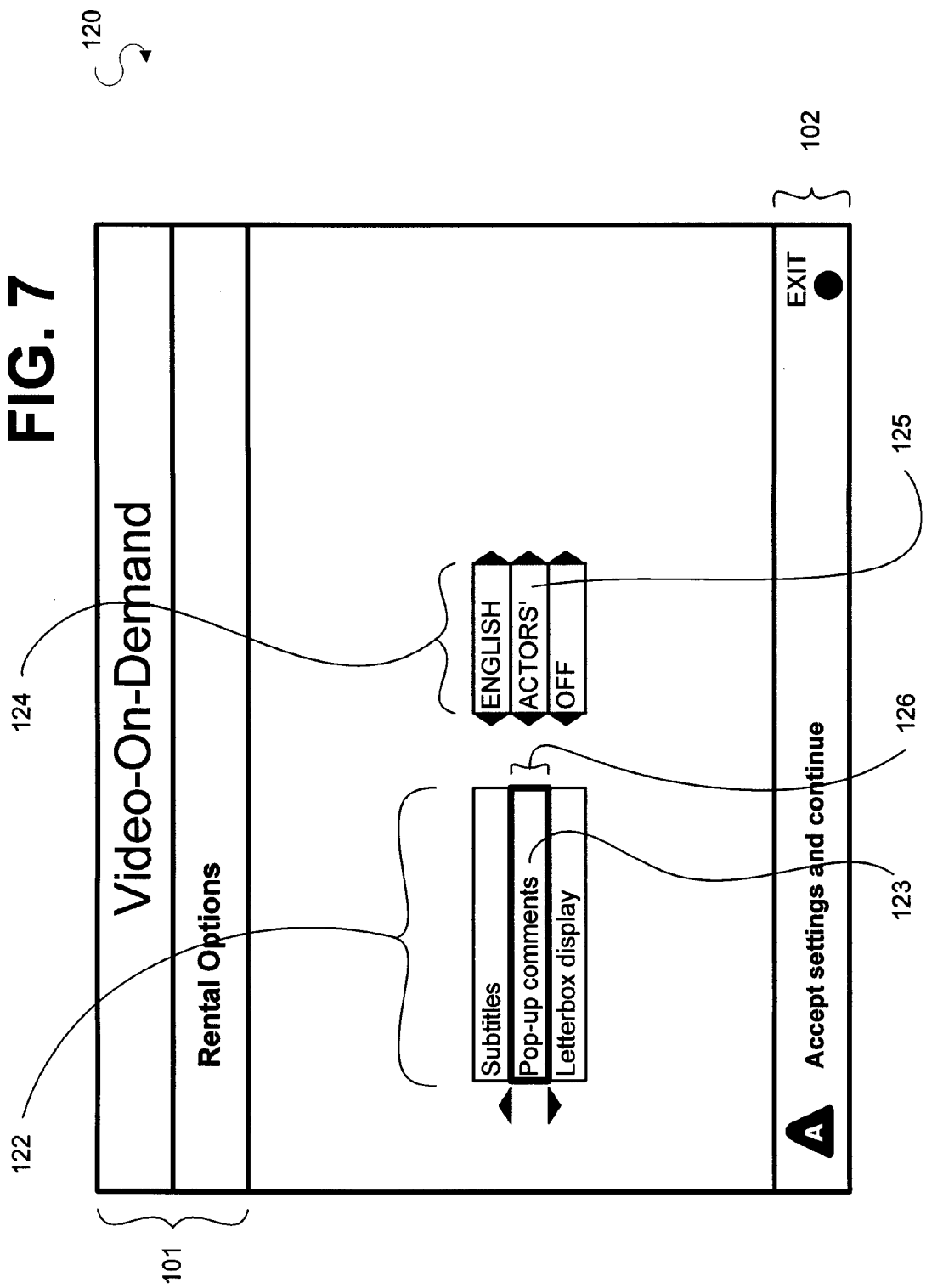
FIG. 7 depicts an example rental options selection window that is presented to the user after the user selects a rental period via the rental period selection window shown in FIG. 6.

FIG. 7 depicts an example rental options selection window 120 that is presented to a user after the user selects a rental period via the rental period selection window 110. Rental options list 122 contains rental options, such as option 123, and a highlighted option area 126. The user may use the up and down arrows 83, 84 to designate a rental option as the highlighted rental option and may use the left and right arrow buttons 85, 86 in order to hop over to the setting list 125 and change the setting of the highlighted rental option 123. Example rental options include subtitles, pop-up comments, and letterbox display.

Information supplements such as pop-up comments settings may include comments from the director, the producer, actors, critics, or other viewers that are displayed at designated time intervals of the on-demand media presentation simultaneously with the on-demand media presentation.

Information supplements comprise media such as textual, graphical, video, or audio information, each to be presented as a single supplement or as a combined set of supplements with the VOD presentation. Information supplements comprise a specification of start time and duration interval in relation to the start of the on-demand title for which they are presented to the user or in relation to some other accessible starting point of the on-demand title such as a chapter. Herein such specification is referred to as the active time interval of the information supplement. An information supplement may exhibit one or more active time interval specifications during the course of the VOD title presentation. The time interval specification enables an information supplement to be presented to the user in a time-synchronized fashion.

Information supplements also comprise other specifications such as screen positioning relative to the picture display of the on-demand title enabling a supplement's respective presentation to overlay the picture display in a predetermined manner to minimize occlusion of the picture.

Popup alerts are optional graphical supplements such as arrows that point attention to inconspicuous parts of the on-demand video picture presentation. They possess active time interval and screen location specifications.

Auditory alerts are optional supplements that are mixed with the audio of the on-demand video program and possess active time interval designation of one or more speaker channels for which to mix the audio supplement, and volume specification.

Multiple video views are optional supplements that provide different camera angles of the media presentation. Their presentation is accomplished with a split-picture display presentation or a picture-in-picture (PIP) presentation. The specification for a multi-video view supplement comprises an active time interval, a screen position, and whether the presentation is effected as a split-screen or PIP supplement.

Advertisement pop-ups are optional supplements that enable the user to receive product information during the on-demand video presentation in exchange for a lower rental fee. The advertisements may be specific to products inherent during the course of the on-demand movie such as a watch worn by a leading actor. Furthermore, the advertisement supplement's active time interval may be concurrent to the time in the movie that the leading actor reads the time on the watch.

Upon a user setting an optional request for one or more information supplements, the MOD client application 63 initiates processor 44 to enable data streams carrying information supplements corresponding to an on-demand video program to be received by demultiplexing system 200, to be transferred to the fourth part of DRAM assigned for reception of data. Supplementary textual or graphical data is then decoded, parsed and interpreted by processor 44 and/or other data parsing and interpretation device (not shown) in DHCT 16 and transferred into a graphics display buffer 240 as graphics data.

Alternatively, if the supplementary data or parts thereof comprise a digital audio component, it is decoded by a first digital audio decoding system 220 or a second digital audio decoding system (not shown) and the supplementary audio is transferred to an assigned Pulse Code Modulation (PCM) audio buffer 250 in DRAM 52. The audio player and output system 240 effects mixing of the supplementary audio stored in the PCM buffer with the designated audio channel of the reconstructed digital audio of the on-demand video program stored in the sixth part of DRAM 52.

Alternatively, if the supplementary data or parts thereof comprise a digital video component, it is received as a video stream of the on-demand video program and processed in DHCT 16 as described above, each processing operation is performed by an aforementioned first processing component in DHCT 16, respectively, or a similar second processing component in DHCT 16 (not shown).

A supplementary video picture may be decompressed by digital video decoding system 210 and scaled down as it is being reconstructed in a procedural fashion with video scaling unit 260 to effect a picture in picture presentation. The scaled down reconstructed picture can be stored in a scaled video picture buffer 270 in DRAM 52. Simultaneous display of the on-demand video picture with a supplementary scaled down video picture 270 can be constructed with supplementary graphical and textual information stored in graphics display buffer 240.

Downscaled video pictures overlay on-demand video presentation by the composition capabilities of DHCT 16 (not shown) and positioned (likely at a corner of screen) as specified by the information supplement specification and only visible during the respective specified active time interval.

Graphical and textual data corresponding to a pop-up supplement overlay the on-demand video presentation on designated screen location per their respective specification and are only visible during their respective specified active time interval The DHCT 16 has an internal clock 280 and timers 290 that enable computation of the time relationship between its internal clock and clock specified by digital video program. Hence, by reading and interpreting the clock and time stamps specifications intrinsic in the digital video program (for example, as provisioned in MPEG-2), DHCT 16 can effect an output as a synchronized presentation to the user that includes the reconstructed on-demand video pictures, the reconstructed digital audio samples, and supplementary information.

Figure 8:
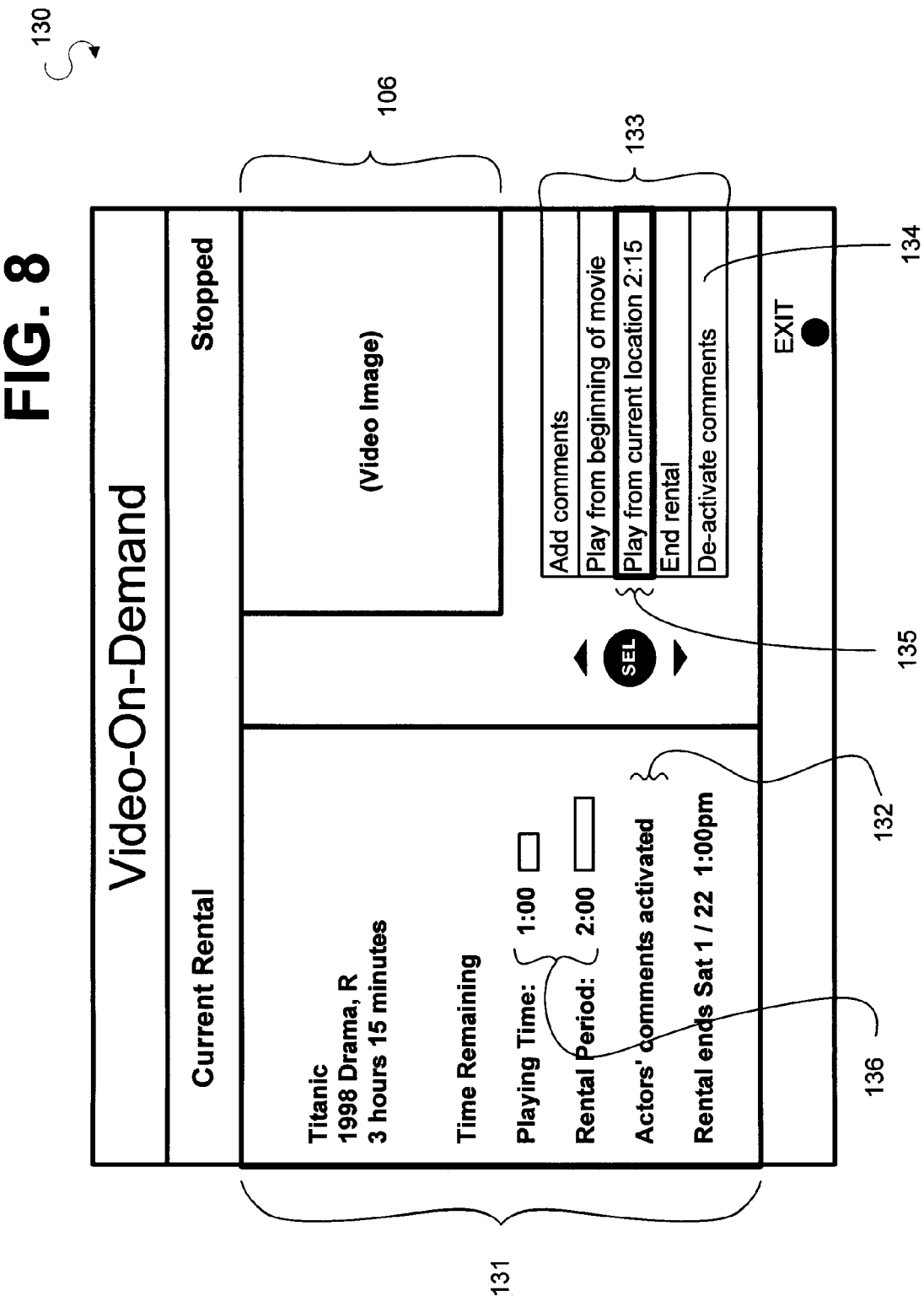
FIG. 8 depicts a stopped video window that is presented to a user after the user stops a media presentation, containing added comments, that was being provided to the user by the DHCT depicted in FIG. 3.

FIG. 8 depicts an example stopped video window 130 that is presented to the user after the user stops the presentation of a video rental for which actors' pop-up comments had been activated. The reduced screen area 106 displays an image from the media rental that was being presented to the user prior to example window 130 being displayed. Information section 131 contains information related to the media rental associated with the image displayed in the reduced screen area 106, including numerical and graphical indications 136 as to the playing time and rental time remaining for the media rental. Rental control options list 133 contains rental control options, such as the option to "De-activate comments" 134, and a highlighted option area 135. A user can de-activate pop-up comments by selecting the "De-activate comments"

option 134 via the remote control device 80. Once this option is selected, the "Actor's comments activated" message 132 is replaced with a message indicating that pop-up comments have been de-activated, and pop-up comments are no longer presented to the user during the remainder of the rental period unless the user subsequently requests otherwise.

Figure 9:
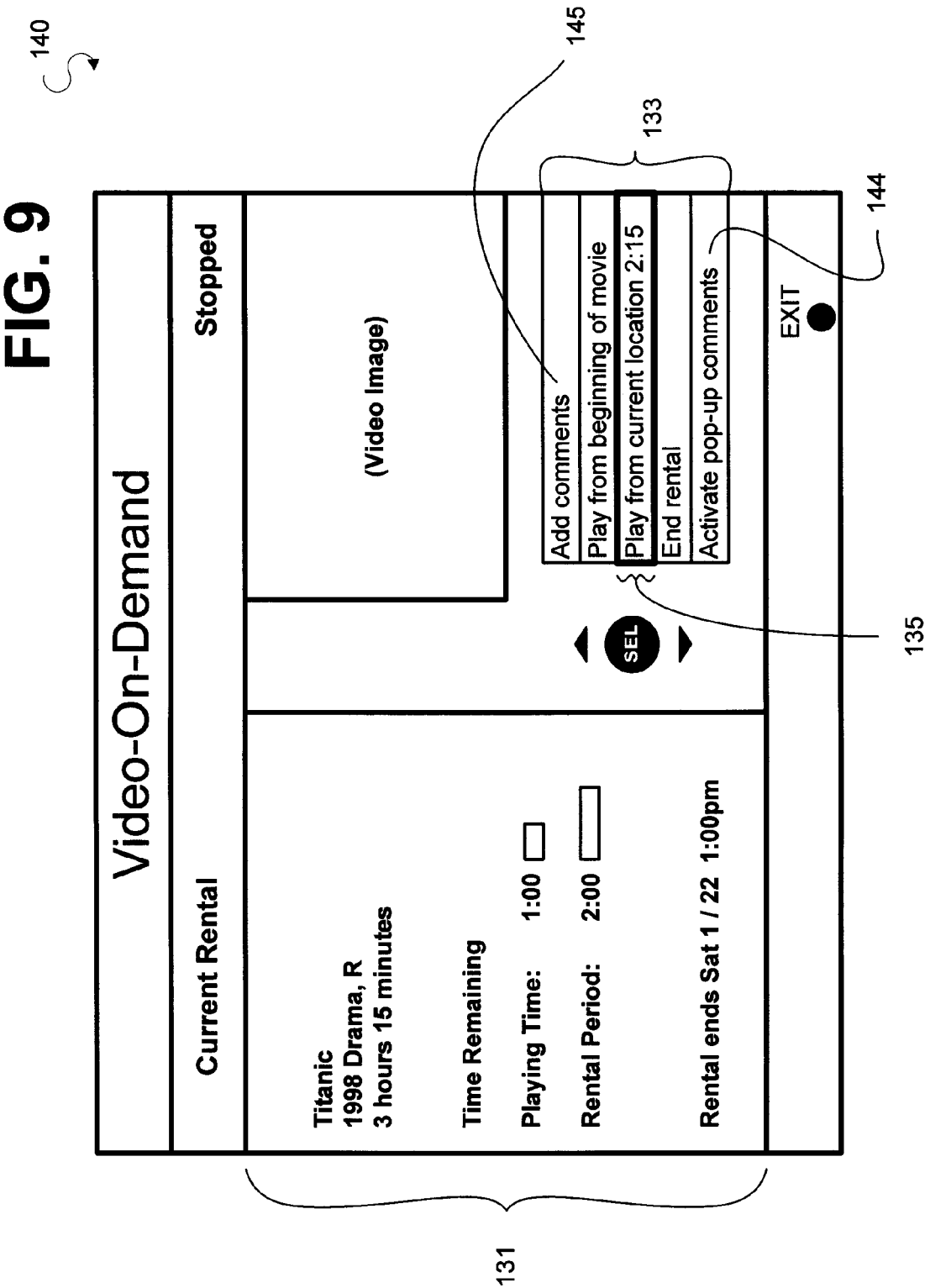
FIG. 9 depicts a stopped video window that is presented to a user after the user stops a media presentation, containing no added comments, that was being provided to the user by the DHCT depicted in FIG. 3.

FIG. 9 depicts an example stopped video window 140 that is presented to the user after the user stops the presentation of a video rental for which pop-up comments are not activated. Rental control options list 133 contains rental control options, such as the option to "Activate pop-up comments" 144, and a highlighted option area 135. A user can activate pop-up comments by selecting the "Activate pop-up comments" option 144 via the remote control device 80. In one embodiment, the user may select an "Add comments" option 145 which enables the user to add comments to the rental selection via the keyboard 73 (FIG. 3) or via an infra-red keyboard (not shown). Comments added by a user during a video presentation are displayed on the television 41 and are stored by the MOD client application 63 in the application memory 70. Once the rental period expires, user comments are transmitted by the MOD client application 63 to the MOD server application 19 (FIG. 2) which edits them (if necessary), integrates them with comments from other users associated with the same video title, and stores them in memory (not shown) at the headend 11. User comments may be edited for things such as vulgar language and excessive length. Integrated user comments associated with a specific media rental may then be presented to a subsequent user who request such comments along with the media rental. In one embodiment, user comments are edited or screened by a system operator.

FIG. 10 depicts an example pop-up comments selection window 150 that is presented to the user after the user selects the "Activate pop-up comments" option 144 via stopped video window 140. Pop-up comments selection list 153 contains pop-up comments types such as director's comments 154, producer's comments 155, actors' comments 156, critics' comments 157, and viewers' comments 158. Once the user selects the type of comments that the user desires to view along with the video rental, such comments are displayed with the video rental the next time that the video rental is presented to the user, unless the user subsequently requests otherwise. The comments may be displayed at the bottom of the television screen or may be proximally located to a displayed item or actor to which/whom the comments respectively pertain.

It should be emphasized that the above-described embodiments of the present invention, particularly any "preferred embodiments", are merely possible examples of the implementations, merely setting forth a clear understanding of the principles of the inventions. Many variations and modifications may be made to the above-described embodiments of the invention without departing substantially from the spirit of the principles of the invention. All such modifications and variations are intended to be included herein within the scope of the disclosure and present invention and protected by the following claims.

Therefore, having thus described the invention, the following is claimed:

1. A method implemented by a digital home communication terminal (DHCT) comprising:
    presenting by the DHCT for display a video presentation;
    enabling a viewer to select an option to receive a plurality of sequential data supplements comprising on-screen comments of the video presentation, the sequential data supplements having a plurality of respective active time intervals of presentation and a screen position relative to the video presentation, wherein the active time intervals are determined based on an internal clock and a timer located on the DHCT;
    receiving a first input from the viewer regarding selection of the option to receive the plurality of sequential data supplements;
    responsive to receiving the first input corresponding to selecting the option to receive the plurality of sequential data supplements, providing the plurality of sequential data supplements for presentation at the plurality of respective active times corresponding to respective portions of the video presentation, the plurality of sequential data supplements are active only during the active time intervals at the screen position;
    receiving a second input from the viewer; and
    providing a video screen in response to the second input, wherein the video screen comprises a first reduced video area for the video presentation, a second reduced area for displaying information related to the video presentation, and a third reduced area for displaying control options for the video presentation, the control options comprising an option to stop the receipt of sequential data supplements.

2. The method of claim 1, wherein the plurality of sequential data supplements are synchronized for presentation only with respect to the respective portions of the video presentation.

3. The method of claim 1, wherein the plurality of sequential data supplements comprise at least one type of data selected from the group consisting of graphical data, textual data, video data, and audio data.

4. The method of claim 1, wherein the video presentation comprises a video-on-demand (VOD) presentation.

5. The method of claim 1, wherein at least a portion of the plurality of sequential data supplements and at least a portion of the video presentation are received from a remote server substantially simultaneously.

6. The method of claim 5, wherein at least a portion of the plurality of sequential data supplements and at least a portion of the video presentation are received from the remote server as part of a single data stream.

7. The method of claim 1, further comprising:
    responsive to receiving the first input corresponding to selecting the option to receive the plurality of sequential data supplements, enabling the viewer to select on-screen comments from at least one other user, a director, a producer, or an actor; and
    receiving a second input from the viewer to select the on-screen comments from the at least one other user, director, producer, or actor.

8. The method of claim 1, further comprising:
    presenting an audio stream and video stream of the video presentation in their respective decoded form; and
    simultaneously presenting sequential portions of a data stream of the sequential data supplements in their respective decoded form at the plurality of respective time intervals corresponding to the respective portions of the video presentation.

9. The method of claim 1, further comprising the step of:
    responsive to receiving another input corresponding to not selecting the option to receive the plurality of sequential data supplements, rejecting the sequential data supplements.

10. The method of claim 1, wherein providing the plurality of sequential data supplements at the plurality of respective times comprises providing the plurality of sequential data supplements at times corresponding to a starting point of the video presentation.

11. The method of claim 1, wherein, responsive to receiving the first input, the method further comprises:
configuring a rental viewing period and an initial transmission of the video presentation and sequential data supplements via a first transmission frequency;
receiving the initial transmission of the video presentation and sequential data supplements during the rental viewing period via a tuner tuned to the first transmission frequency channel; and
presenting a respective portion of the initial transmission of the video presentation and sequential data supplements simultaneously at a plurality of respective time intervals corresponding to respective portions of the video presentation.

12. A digital home communication terminal (DHCT) comprising:
a receiver configured to receive from a remote server a video presentation and supplementary information corresponding to and synchronized with the video presentation, the supplementary information comprising on-screen comments;
memory configure to store program code; and
a processing device configured to execute the program code stored in memory to enable the DHCT to:
provide a selectable option to receive the supplementary information;
responsive to receiving an input to select the option, receive the supplementary information;
provide the video presentation and providing the supplementary information at a plurality of respective active times corresponding to respective portions of the video presentation, and a screen position relative to the video presentation, wherein the active time intervals are determined based on an internal clock and a timer located on the DHCT;
receive a second input from the viewer; and
provide a video screen in response to the second input, wherein the video screen comprises a first reduced video area for the video presentation, a second reduced area for displaying information related to the video presentation, and a third reduced area for displaying control options for the video presentation, the control options comprising an option to stop the receipt of sequential data supplements.

13. The DHCT of claim 12, wherein the supplementary information comprises at least one type of data selected from the group consisting of graphical data, textual data, video data, and audio data.

14. The DHCT of claim 12, wherein the supplementary information comprises advertising.

15. The DHCT of claim 12, wherein the video presentation comprises a video-on-demand (VOD) presentation.

16. The DHCT of claim 12, wherein the receiver is configured to receive at least a portion of the supplementary information and at least a portion of the video presentation substantially simultaneously.

17. The DHCT of claim 12, wherein at least a portion of the supplementary information and at least a portion of the video presentation are presented as a television signal.

18. The DHCT of claim 12, wherein, responsive to receiving the first input to select the option to receive the supplementary information, the processing device is further configured to enable the DHCT to:
present a first indication that the option to display on-screen comments has been activated; and
responsive to receiving a second input to de-activate the on-screen comments, reject the supplementary information and present a second indication that the option to display on-screen comments has been de-activated.

19. The DHCT of claim 12, wherein, responsive to not receiving another input to select the option to receive the supplementary information, the processing device is further configured to enable the DHCT to:
present a first indication that the option to display on-screen comments has been de-activated; and
responsive to receiving a second input to activate the on-screen comments, present the supplementary information in its decoded form at a plurality of respective time intervals corresponding to respective portions of the video presentation.

20. A video system comprising:
means for receiving a video presentation from a remote server;
means for receiving a first selection from a viewer, the first selection corresponding to an option to receive a supplementary data stream corresponding to and synchronized for automatic presentation with the video presentation based on what portion of the video presentation is to be presented, the supplementary data stream comprising information related to on-screen comments;
means for presenting the video presentation;
means for receiving the supplementary data stream responsive to receiving a first choice associated with the first selection, the first choice corresponding to selecting to receive the supplementary data stream, wherein the supplementary data stream is received for presentation at a plurality of respective active times corresponding to respective portions of the video presentation, and a screen position relative to the video presentation, wherein the active time intervals are determined based on an internal clock and a timer located on the DHCT;
means for receiving a second input from the viewer; and
means for providing a video screen in response to the second input, wherein the video screen comprises a first reduced video area for the video presentation, a second reduced area for displaying information related to the video presentation, and a third reduced area for displaying control options for the video presentation, the control options comprising an option to stop the receipt of sequential data supplements.

21. The video system of claim 20, wherein the means for receiving the video presentation is further configured to receive at least a portion of the supplementary data stream and at least a portion of the video presentation substantially simultaneously.

22. The video system of claim 21, wherein the means for receiving the video presentation is further configured to receive at least a portion of the supplementary data stream and at least a portion of the video presentation as part of a single data stream.

23. The video system of claim 20, wherein the means for providing the supplementary data stream is further configured to provide the supplementary data stream at a time interval during which a predetermined visual object of the video presentation is presented.

24. The video system of claim 20, further comprising:
means for tuning to a transmission channel to simultaneously receive the video presentation and supplementary data stream.

25. The video system of claim 24, wherein the means for providing the supplementary data stream is further configured to provide sequential portions of the supplementary data stream at a plurality of respective time intervals corresponding to respective portions of the video presentation based on a time-synchronized composition of the video presentation and supplementary data stream according to time stamp specifications.

26. The video system of claim 20, wherein the video presentation comprises a video-on-demand (VOD) program established over a dedicated network session between the remote server and the means for receiving the video presentation.

27. The video system of claim 20, wherein:
the video presentation comprises an audio stream and video stream;
the audio stream, video stream, and supplementary data stream are encrypted; and
the means for receiving the video presentation is further configured to receive the encrypted audio stream, video stream, and supplementary data stream over the same transmission frequency channel.

28. The video system of claim 20, further comprising:
means for enabling the viewer to add comments associated with the video presentation; and
means for transmitting the comments added by the viewer to the remote server after the video presentation has been presented.

* * * * *